US010652633B2

(12) United States Patent
Borrelli et al.

(10) Patent No.: US 10,652,633 B2
(45) Date of Patent: May 12, 2020

(54) INTEGRATED SOLUTIONS OF INTERNET OF THINGS AND SMART GRID NETWORK PERTAINING TO COMMUNICATION, DATA AND ASSET SERIALIZATION, AND DATA MODELING ALGORITHMS

(71) Applicant: Delta Energy & Communications, Inc., Murrieta, CA (US)

(72) Inventors: Angelo Borrelli, Fairhope, AL (US); Keith Teichmann, Newton Centre, MA (US); Scott Foster, Murrieta, CA (US); Anthony Mandio, San Diego, CA (US)

(73) Assignee: DELTA ENERGY & COMMUNICATIONS, INC., Murrieta, CA (US)

( * ) Notice: Subject to any disclaimer, the term of this patent is extended or adjusted under 35 U.S.C. 154(b) by 0 days.

(21) Appl. No.: 15/677,920

(22) Filed: Aug. 15, 2017

(65) Prior Publication Data

US 2018/0132015 A1    May 10, 2018

Related U.S. Application Data

(60) Provisional application No. 62/375,170, filed on Aug. 15, 2016.

(51) Int. Cl.
*H04Q 9/00* (2006.01)
*G06F 11/30* (2006.01)
(Continued)

(52) U.S. Cl.
CPC ........... *H04Q 9/00* (2013.01); *G06F 11/3006* (2013.01); *G06F 11/3058* (2013.01);
(Continued)

(58) Field of Classification Search
CPC .......... G01D 4/00; G01D 4/002; G01D 4/004; H04B 2203/5433; H04Q 2209/00;
(Continued)

(56) References Cited

U.S. PATENT DOCUMENTS 2,704,809 A   3/1955   Williams
4,724,381 A   2/1988   Crimmins
(Continued)

FOREIGN PATENT DOCUMENTS

CN    101860978    10/2010
CN    102255869    11/2011
(Continued)

OTHER PUBLICATIONS

International Search Report and Written Opinion, International Application No. PCT/US2017/46991, dated Nov. 21, 2017 (8 pages).
(Continued)

*Primary Examiner* — Franklin D Balseca
(74) *Attorney, Agent, or Firm* — Ware, Fressola, Maguire & Barber LLP

(57) ABSTRACT

A smart grid network is provided including one or more transformer monitoring devices configured to collect metering data from one or more metering devices in the smart grid network. The smart grid network further includes a cloud-based data processing and storage system with one or more cloud data processors configured to receive data from the one or more transformer monitoring devices and process the received data into categories including at least a first category of data comprising the collected metering data. The cloud-based data processing and storage system further includes at least one data store to store data of at least the first category of data, an analytics platform configured to analyze the received and categorized data and a graphics server configured to format the analyzed data for display on a user device of the smart grid network.

23 Claims, 8 Drawing Sheets

(51) Int. Cl.
*G06T 11/60* (2006.01)
*H04L 29/08* (2006.01)

(52) U.S. Cl.
CPC .......... *G06T 11/60* (2013.01); *H04L 67/1097* (2013.01); *H04Q 2209/25* (2013.01); *H04Q 2209/43* (2013.01)

(58) Field of Classification Search
CPC ........... H04Q 2209/10; H04Q 2209/20; H04Q 2209/30; H04Q 2209/40; H04Q 2209/60; H04Q 9/00; H04Q 2209/25; H04Q 2209/43; G06F 11/30; G06F 11/3006; G06F 11/3058; G06T 11/60; H04L 67/1097
See application file for complete search history.

(56) References Cited

U.S. PATENT DOCUMENTS

| | | | |
|---|---|---|---|
| 5,426,360 A | 6/1995 | Maraio et al. | |
| 5,748,104 A | 5/1998 | Argyroudis et al. | |
| 5,940,009 A | 8/1999 | Loy et al. | |
| 6,018,449 A | 1/2000 | Nelson et al. | |
| 6,211,764 B1 | 4/2001 | Schweitzer, Jr. | |
| 6,300,881 B1 | 10/2001 | Yee et al. | |
| 6,549,120 B1 | 4/2003 | de Buda | |
| 6,711,512 B2 | 3/2004 | Noh | |
| 6,829,491 B1 | 12/2004 | Yea et al. | |
| 6,856,256 B2 | 2/2005 | Winkler | |
| 6,880,086 B2 | 4/2005 | Kidder et al. | |
| 6,906,630 B2 | 6/2005 | Georges et al. | |
| 6,998,962 B2 | 2/2006 | Cope et al. | |
| 7,049,976 B2 | 5/2006 | Hunt et al. | |
| 7,054,770 B2 | 5/2006 | Swarztrauber et al. | |
| 7,058,524 B2 | 6/2006 | Hayes et al. | |
| 7,107,329 B1 | 9/2006 | Schroder et al. | |
| 7,126,558 B1 | 10/2006 | Dempski | |
| 7,271,735 B2 | 9/2007 | Rogai | |
| 7,304,587 B2 | 12/2007 | Boaz | |
| 7,310,052 B2 | 12/2007 | Bowman | |
| 7,402,993 B2 | 7/2008 | Morrison | |
| 7,440,436 B2 | 10/2008 | Cheng et al. | |
| 7,496,078 B2 | 2/2009 | Rahman | |
| 7,733,839 B1 | 6/2010 | Frank et al. | |
| 7,747,534 B2 | 6/2010 | Villicana et al. | |
| 7,764,943 B2 | 7/2010 | Radtke | |
| 7,894,371 B2 | 2/2011 | Bonta et al. | |
| 7,936,163 B2 | 5/2011 | Lee, Jr. | |
| 7,940,039 B2 | 5/2011 | de Buda | |
| 7,961,740 B2 | 6/2011 | Flammer, III et al. | |
| 8,054,199 B2 | 11/2011 | Addy | |
| 8,060,259 B2 | 11/2011 | Budhraja et al. | |
| 8,121,741 B2 | 2/2012 | Taft et al. | |
| 8,145,732 B2 | 3/2012 | Kumar et al. | |
| 8,194,275 B2 | 6/2012 | Furst et al. | |
| 8,279,870 B2 | 10/2012 | Flammer, III et al. | |
| 8,305,932 B2 | 11/2012 | Qiu et al. | |
| 8,311,863 B1 | 11/2012 | Kemp | |
| 8,370,697 B2 | 2/2013 | Veillette | |
| 8,373,575 B2 | 2/2013 | Boettner et al. | |
| 8,385,978 B2 | 2/2013 | Leung et al. | |
| 8,401,709 B2 | 3/2013 | Cherian et al. | |
| 8,412,735 B2 | 4/2013 | Yeh et al. | |
| 8,423,637 B2 * | 4/2013 | Vaswani | G01D 4/004 709/224 |
| 8,428,021 B2 | 4/2013 | Karunakaran et al. | |
| 8,437,883 B2 | 5/2013 | Powell et al. | |
| 8,441,372 B2 | 5/2013 | Smith et al. | |
| 8,452,555 B2 | 5/2013 | Swarztrauber et al. | |
| 8,509,953 B2 | 8/2013 | Taft | |
| 8,543,250 B2 | 9/2013 | Seo et al. | |
| 8,553,561 B1 | 10/2013 | Chokshi et al. | |
| 8,566,046 B2 | 10/2013 | Deaver, Sr. | |
| 8,583,520 B1 | 11/2013 | Forbes, Jr. | |
| 8,600,572 B2 | 12/2013 | Sri-Jayantha | |
| 8,660,868 B2 | 2/2014 | Vogel et al. | |
| 8,755,303 B2 * | 6/2014 | Hughes | G01D 4/004 370/254 |
| 8,792,626 B2 | 7/2014 | Cook et al. | |
| 8,847,826 B2 | 9/2014 | Rao et al. | |
| 8,855,102 B2 | 10/2014 | Borleske et al. | |
| 8,862,281 B2 | 10/2014 | Yoneda et al. | |
| 8,874,477 B2 | 10/2014 | Hoffberg | |
| 8,880,234 B2 | 11/2014 | Sekoguchi et al. | |
| 8,909,358 B2 | 12/2014 | Kamouskos | |
| 8,917,716 B2 | 12/2014 | Tran | |
| 8,937,497 B1 | 1/2015 | Tobin | |
| 8,959,114 B2 * | 2/2015 | Rehman | G06Q 30/0232 707/784 |
| 8,963,807 B1 | 2/2015 | Lee et al. | |
| 8,964,757 B2 | 2/2015 | Watson et al. | |
| 8,965,590 B2 | 2/2015 | Boardman et al. | |
| 8,970,394 B2 | 3/2015 | Veillette | |
| 9,002,670 B2 | 4/2015 | Hurri et al. | |
| 9,013,173 B2 | 4/2015 | Veillette | |
| 9,014,996 B2 | 4/2015 | Kamel et al. | |
| 9,031,116 B2 * | 5/2015 | Young | H04Q 9/00 375/146 |
| 9,043,174 B2 | 5/2015 | Arya et al. | |
| 9,052,216 B2 | 6/2015 | Kamel et al. | |
| 9,087,451 B1 | 7/2015 | Jarrell | |
| 9,110,101 B2 | 8/2015 | Pietrowicz et al. | |
| 9,112,381 B2 | 8/2015 | Carralero et al. | |
| 9,118,219 B2 | 8/2015 | Booth | |
| 9,129,355 B2 | 9/2015 | Harvey et al. | |
| 9,141,653 B2 | 9/2015 | Zhou et al. | |
| 9,144,082 B2 | 9/2015 | Rubin et al. | |
| 9,162,753 B1 | 10/2015 | Panto et al. | |
| 9,400,192 B1 | 7/2016 | Salser, Jr. et al. | |
| 9,400,867 B2 * | 7/2016 | Boyd | G06F 11/3013 |
| 9,402,292 B1 | 7/2016 | Gordin et al. | |
| 9,451,060 B1 | 9/2016 | Bowers et al. | |
| 9,500,716 B2 * | 11/2016 | Turner | G01R 31/40 |
| 9,654,173 B2 | 5/2017 | Barzegar et al. | |
| 9,961,572 B2 | 5/2018 | Foster et al. | |
| 10,055,869 B2 | 8/2018 | Borrelli et al. | |
| 10,055,966 B2 | 8/2018 | Foster et al. | |
| 2001/0038342 A1 | 11/2001 | Foote | |
| 2002/0046368 A1 | 4/2002 | Friedrich et al. | |
| 2002/0064010 A1 | 5/2002 | Nelson et al. | |
| 2003/0050737 A1 | 3/2003 | Osann, Jr. | |
| 2003/0078996 A1 | 4/2003 | Baldwin | |
| 2003/0128149 A1 | 7/2003 | Miceli et al. | |
| 2004/0082203 A1 | 4/2004 | Logvinov et al. | |
| 2005/0078624 A1 | 4/2005 | Shu et al. | |
| 2005/0088299 A1 * | 4/2005 | Bandy | G01N 33/0075 340/539.16 |
| 2006/0007016 A1 | 1/2006 | Borkowski et al. | |
| 2006/0056363 A1 | 3/2006 | Ratiu et al. | |
| 2006/0141940 A1 | 6/2006 | Bloom et al. | |
| 2006/0145834 A1 | 7/2006 | Berkman et al. | |
| 2007/0043849 A1 * | 2/2007 | Lill | H04L 29/06 709/224 |
| 2007/0048702 A1 | 3/2007 | Jang et al. | |
| 2007/0088630 A1 | 4/2007 | MacLeod et al. | |
| 2008/0065342 A1 | 3/2008 | Zalitzky et al. | |
| 2008/0100436 A1 | 5/2008 | Banting et al. | |
| 2008/0109387 A1 | 5/2008 | Deaver et al. | |
| 2008/0272934 A1 | 11/2008 | Wang et al. | |
| 2008/0317047 A1 | 12/2008 | Zeng et al. | |
| 2009/0003662 A1 | 1/2009 | Joseph et al. | |
| 2009/0088907 A1 | 4/2009 | Lewis et al. | |
| 2009/0102680 A1 | 4/2009 | Roos | |
| 2009/0111456 A1 | 4/2009 | Shaffer et al. | |
| 2009/0146839 A1 | 6/2009 | Reddy et al. | |
| 2009/0167558 A1 | 7/2009 | Borleske et al. | |
| 2009/0187284 A1 | 7/2009 | Kreiss et al. | |
| 2009/0240449 A1 | 9/2009 | Gibala et al. | |
| 2009/0267792 A1 | 10/2009 | Crichlow | |
| 2010/0074176 A1 | 3/2010 | Flammer, III et al. | |
| 2010/0278187 A1 | 11/2010 | Hart et al. | |
| 2010/0313146 A1 | 12/2010 | Nielsen et al. | |
| 2011/0026500 A1 | 2/2011 | Shaffer et al. | |

(56) References Cited

U.S. PATENT DOCUMENTS

| | | |
|---|---|---|
| 2011/0047230 A1 | 2/2011 | McGee |
| 2011/0066297 A1 | 3/2011 | Saberi et al. |
| 2011/0090833 A1 | 4/2011 | Kneckt et al. |
| 2011/0208367 A1 | 8/2011 | Sackman et al. |
| 2011/0255417 A1 | 10/2011 | Mohan et al. |
| 2012/0007885 A1 | 1/2012 | Huston |
| 2012/0029897 A1 | 2/2012 | Cherian et al. |
| 2012/0050971 A1 | 3/2012 | Seal et al. |
| 2012/0058790 A1 | 3/2012 | Junnell et al. |
| 2012/0059609 A1 | 3/2012 | Oh et al. |
| 2012/0078686 A1 | 3/2012 | Bashani |
| 2012/0089268 A1 | 4/2012 | Torre et al. |
| 2012/0092114 A1 | 4/2012 | Matthews |
| 2012/0106394 A1 | 5/2012 | Apostolakis |
| 2012/0126790 A1 | 5/2012 | Sobotka et al. |
| 2012/0126994 A1* | 5/2012 | Sobotka ............ H04B 3/54 340/870.02 |
| 2012/0131324 A1 | 5/2012 | Ansari et al. |
| 2012/0154171 A1* | 6/2012 | Hurri ............ H04Q 9/00 340/870.02 |
| 2012/0229089 A1 | 9/2012 | Bemmel et al. |
| 2012/0229296 A1 | 9/2012 | Ree |
| 2012/0230237 A1 | 9/2012 | Gong et al. |
| 2012/0242698 A1 | 9/2012 | Haddick et al. |
| 2012/0249741 A1 | 10/2012 | Maciocci et al. |
| 2012/0253881 A1 | 10/2012 | Schneider et al. |
| 2012/0265355 A1 | 10/2012 | Bernheim et al. |
| 2012/0277926 A1 | 11/2012 | Nielsen et al. |
| 2012/0303746 A1 | 11/2012 | Yu et al. |
| 2012/0316688 A1 | 12/2012 | Boardman et al. |
| 2012/0316696 A1 | 12/2012 | Boardman et al. |
| 2013/0026986 A1 | 1/2013 | Parthasarathy et al. |
| 2013/0035802 A1 | 2/2013 | Khaitan et al. |
| 2013/0069985 A1 | 3/2013 | Wong et al. |
| 2013/0077610 A1 | 3/2013 | Amini et al. |
| 2013/0103660 A1 | 4/2013 | Welsh et al. |
| 2013/0106617 A1 | 5/2013 | Heo et al. |
| 2013/0110837 A1* | 5/2013 | Dai ............ H04Q 9/00 707/737 |
| 2013/0123998 A1 | 5/2013 | King et al. |
| 2013/0190939 A1 | 7/2013 | Lenox |
| 2013/0203378 A1 | 8/2013 | Vos et al. |
| 2013/0218495 A1 | 8/2013 | Boone et al. |
| 2013/0222215 A1 | 8/2013 | Kobayashi |
| 2013/0223334 A1 | 8/2013 | Guo et al. |
| 2013/0278437 A1 | 10/2013 | Wyk |
| 2013/0278631 A1 | 10/2013 | Border et al. |
| 2013/0289782 A1 | 10/2013 | Giroti |
| 2013/0297087 A1 | 11/2013 | Koster et al. |
| 2013/0297239 A1 | 11/2013 | Arya et al. |
| 2013/0297868 A1 | 11/2013 | Yin et al. |
| 2013/0304264 A1 | 11/2013 | Shao |
| 2013/0335062 A1 | 12/2013 | de Buda et al. |
| 2014/0067330 A1 | 3/2014 | Flammer, III |
| 2014/0092765 A1 | 4/2014 | Kgarwal et al. |
| 2014/0098685 A1 | 4/2014 | Shattil |
| 2014/0129160 A1 | 5/2014 | Tran |
| 2014/0167977 A1 | 6/2014 | Bean et al. |
| 2014/0172133 A1 | 6/2014 | Snyder |
| 2014/0183964 A1 | 7/2014 | Walley |
| 2014/0233620 A1 | 8/2014 | Bernheim et al. |
| 2014/0237525 A1 | 8/2014 | Rothschild et al. |
| 2014/0241354 A1 | 8/2014 | Shuman et al. |
| 2014/0244017 A1 | 8/2014 | Freiwirth et al. |
| 2014/0244768 A1 | 8/2014 | Shuman et al. |
| 2014/0244833 A1 | 8/2014 | Sharma et al. |
| 2014/0259108 A1 | 9/2014 | Clark et al. |
| 2014/0267400 A1 | 9/2014 | Mabbutt et al. |
| 2014/0270749 A1 | 9/2014 | Miniscalo et al. |
| 2014/0277813 A1 | 9/2014 | Powell et al. |
| 2014/0279694 A1 | 9/2014 | Gauger et al. |
| 2014/0289004 A1 | 9/2014 | Monforte et al. |
| 2014/0297206 A1 | 10/2014 | Siverman |
| 2014/0300210 A1 | 10/2014 | Abi-Ackel et al. |
| 2014/0300344 A1 | 10/2014 | Turner et al. |
| 2014/0306525 A1 | 10/2014 | Greer et al. |
| 2014/0312802 A1 | 10/2014 | Recker et al. |
| 2014/0320306 A1 | 10/2014 | Winter |
| 2014/0334073 A1 | 11/2014 | Thompson et al. |
| 2014/0358315 A1 | 12/2014 | Liu et al. |
| 2014/0361907 A1 | 12/2014 | Bernheim et al. |
| 2014/0368189 A1 | 12/2014 | Bernheim et al. |
| 2014/0371941 A1 | 12/2014 | Keller et al. |
| 2014/0372583 A1 | 12/2014 | Tseng |
| 2014/0376405 A1 | 12/2014 | Erickson et al. |
| 2014/0376914 A1 | 12/2014 | Miniscalo |
| 2014/0380488 A1 | 12/2014 | Datta Ray et al. |
| 2015/0002186 A1 | 1/2015 | Taft |
| 2015/0019342 A1 | 1/2015 | Gupta |
| 2015/0019553 A1 | 1/2015 | Shaashua et al. |
| 2015/0058445 A1 | 2/2015 | Choi et al. |
| 2015/0063202 A1 | 3/2015 | Mazzarella |
| 2015/0066772 A1 | 3/2015 | Griffin et al. |
| 2015/0094874 A1 | 4/2015 | Hall et al. |
| 2015/0094968 A1 | 4/2015 | Jia et al. |
| 2015/0095936 A1 | 4/2015 | Yu et al. |
| 2015/0112469 A1 | 4/2015 | Da Silva Neto et al. |
| 2015/0121470 A1 | 4/2015 | Rongo et al. |
| 2015/0127601 A1 | 5/2015 | McGill et al. |
| 2015/0142963 A1 | 5/2015 | Choi et al. |
| 2015/0148979 A1 | 5/2015 | Forbes, Jr. |
| 2015/0149396 A1 | 5/2015 | Arya et al. |
| 2015/0155713 A1 | 6/2015 | Forbes, Jr. |
| 2015/0163849 A1 | 6/2015 | Bauer et al. |
| 2015/0179062 A1 | 6/2015 | Ralston et al. |
| 2015/0200713 A1 | 7/2015 | Hui et al. |
| 2015/0200846 A1 | 7/2015 | Hui et al. |
| 2015/0220762 A1 | 8/2015 | Jiang et al. |
| 2015/0249595 A1 | 9/2015 | Geiger |
| 2015/0256433 A1 | 9/2015 | Sum et al. |
| 2015/0256435 A1 | 9/2015 | Sum et al. |
| 2015/0276433 A1* | 10/2015 | Brahmajosyula ........ H04Q 9/14 340/870.02 |
| 2015/0281996 A1 | 10/2015 | Rubin et al. |
| 2015/0288532 A1 | 10/2015 | Veyseh et al. |
| 2015/0288825 A1 | 10/2015 | Cook |
| 2015/0294557 A1 | 10/2015 | Willig et al. |
| 2015/0311951 A1 | 10/2015 | Hariz |
| 2015/0370615 A1 | 12/2015 | Pi-Sunyer |
| 2015/0373521 A1 | 12/2015 | Olesen et al. |
| 2015/0373641 A1 | 12/2015 | Yamana et al. |
| 2016/0029384 A1 | 1/2016 | Sidhu et al. |
| 2016/0081127 A1 | 3/2016 | Lee et al. |
| 2016/0094402 A1 | 3/2016 | Finkelstein |
| 2016/0134932 A1 | 5/2016 | Karp et al. |
| 2016/0205106 A1 | 7/2016 | Yacoub et al. |
| 2016/0214715 A1 | 7/2016 | Meffert |
| 2016/0261425 A1 | 9/2016 | Horton et al. |
| 2016/0292205 A1 | 10/2016 | Massey et al. |
| 2016/0327603 A1 | 11/2016 | Sonderegger et al. |
| 2016/0360361 A1 | 12/2016 | Ross et al. |
| 2016/0366461 A1 | 12/2016 | Hu et al. |
| 2017/0003142 A1 | 1/2017 | Allcorn et al. |
| 2017/0048598 A1 | 2/2017 | Foster et al. |
| 2017/0108236 A1 | 4/2017 | Guan et al. |
| 2017/0134092 A1 | 5/2017 | Foster et al. |
| 2017/0223807 A1 | 8/2017 | Recker et al. |
| 2017/0237612 A1 | 8/2017 | Foster et al. |
| 2017/0302511 A1 | 10/2017 | Foster et al. |
| 2017/0339536 A1* | 11/2017 | Lewis ............ H04W 4/12 |
| 2018/0267494 A1 | 9/2018 | Meranda et al. |
| 2018/0366978 A1 | 12/2018 | Matan et al. |

FOREIGN PATENT DOCUMENTS

| | | |
|---|---|---|
| CN | 102355682 | 2/2012 |
| CN | 102412530 | 4/2012 |
| CN | 102508989 | 6/2012 |
| CN | 202513670 | 10/2012 |
| CN | 103078673 | 5/2013 |
| CN | 103209385 | 7/2013 |
| CN | 103313437 | 9/2013 |
| CN | 103488988 | 1/2014 |
| CN | 103810753 | 5/2014 |

(56) References Cited

FOREIGN PATENT DOCUMENTS

| | | |
|---|---|---|
| CN | 203965904 | 11/2014 |
| CN | 104238730 | 12/2014 |
| CN | 104333733 | 2/2015 |
| CN | 204142366 | 2/2015 |
| CN | 20403734 | 3/2015 |
| CN | 104485746 | 4/2015 |
| CN | 104581087 | 4/2015 |
| CN | 204465736 | 7/2015 |
| CN | 204595654 | 8/2015 |
| EP | 2296069 | 3/2011 |
| EP | 2818878 | 12/2014 |
| EP | 2721772 | 10/2015 |
| KR | 20130108769 A | 10/2013 |
| WO | 2009059386 | 5/2009 |
| WO | 2010003452 | 1/2010 |
| WO | 2011079358 | 7/2011 |
| WO | 2012047089 | 4/2012 |
| WO | 2012122454 | 9/2012 |
| WO | 2012142586 | 10/2012 |
| WO | 2012154938 | 11/2012 |
| WO | 2012155126 | 11/2012 |
| WO | 2013019595 | 2/2013 |
| WO | 2013028407 | 2/2013 |
| WO | 2013123445 | 8/2013 |
| WO | 2013173230 | 11/2013 |
| WO | 2014056558 | 4/2014 |
| WO | 2014091434 | 6/2014 |
| WO | 2014118622 | 8/2014 |
| WO | 2014123737 | 8/2014 |
| WO | 2014124318 | 8/2014 |
| WO | 2014130568 | 8/2014 |
| WO | 2014169018 | 10/2014 |
| WO | 2014175721 | 10/2014 |
| WO | 2015032164 | 3/2015 |
| WO | 2015046695 | 4/2015 |
| WO | 2015073687 | 5/2015 |
| WO | 2015105658 | 7/2015 |
| WO | 2015123623 | 8/2015 |
| WO | 2015131462 | 9/2015 |
| WO | 2015138447 | 9/2015 |
| WO | 2015161083 | 10/2015 |

OTHER PUBLICATIONS

Lockheed Martin, "Self-Powered Ad-hoc Network", http://www.lockheedmartin.com/us/products/span.html, accessed Nov. 9, 2015.
Owada, et al., "Design for Disaster-Tolerant and Dependable Network Architecture," ICMU 2012, pp. 136-141, Information Processing Society of Japan, 2012.
Morganthaler, et al., "UAVNet: A Mobile Wireless Mesh Network Using Unmanned Aerial Vehicles," available at http://rvs.unibe.ch/research/pub_files/MBZSA12.pdf, 2012.
Snow, "Why Drones Are the Future of the Internet of Things", Dec. 1, 2014, available at https://www.suasnews.com/2014/12/why-drones-are-the-future-of-the-internet-of-things/.
St. John, Jeff, "How Utilities Could Use Virtual Reality and Google Glass to Monitor the Grid," Mar. 3, 2015, 6 pages.
InfoBright, "Internet of Things Part 8: Smart Grids—the Future of Energy Delivery," 2014, 2 pages, https://www.infobright.com/index.php/internet-of-things-part-8-smart-grids-future-energy-delivery/#.VdHztvIVhBd.
Monnier, Olivier, "A Smarter Grid With the Internet of Things," Texas Instruments, Oct. 2013, 11 pages.
International Search Report and Written Opinion dated Oct. 28, 2016 issued in international patent application No. PCT/US2016/045233 (10 pages).
International Search Report and Written Opinion dated Dec. 9, 2016 in international patent application No. PCT/US2016/046509 (13 pages).
International Search Report and Written Opinion dated Dec. 19, 2016 in international patent application No. PCT/US16/50393 (11 pages).
International Search Report and Written Opinion dated Jan. 23, 2017 in international patent application No. PCT/US2016/049245 (16 pages).
International Search Report and Written Opinion dated Jan. 19, 2017 in international patent application No. PCT/US2016/058407 (16 pages).
International Search Report and Written Opinion dated Jan. 25, 2017 in international patent application No. PCT/US2016/058383 (13 pages).
International Search Report and Written Opinion dated May 26, 2017 in international patent application No. PCT/US2017/019434 (10 pages).
Devidas, A. R. and Ramesh, M. V., "Wireless Smart Grid Design for Monitoring and Optimizing Electric Transmission in India," 2010 Fourth International Conference on Sensor Technologies and Applications, Jul. 18-25, 2010, Venice, IEEE, pp. 637-640 (2 pages).
Erol-Kantarci, M. and Mouftah, H. T., "Wireless Multimedia Sensor and Actor Networks for the Next Generation Power Grid," Ad Hoc Networks, vol. 9, Issue 4, Jun. 2011, pp. 542-551 (2 pages).
Gungor, V. C., Lu, B. and Hancke, G. P., "Opportunities and Challenges of Wireless Sensor Networks in Smart Grid," IEEE Transactions on Industrial Electronics, vol. 57, No. 10, Oct. 2010, pp. 3557-3564.
Nasipuri, A. et al., "Demo Abstract: Wireless Sensor Network for Substation Monitoring: Design and Deployment," ResearchGate Conference Paper, Jan. 2008 (3 pages).
GridSense, "Maximize Intelligence and Minimize Costs at the Distribution Level," http://www.gridsense.com/solutions-products/transformer-monitoring/distribution-transformer-monitoring/, accessed Oct. 13, 2015, 3 pages.
Balakrishnan et al., "Models for Planning Capacity Expansion in Local Access Telecommunication Networks," Massachusetts Institute of Technology Sloan School Working Paper #3048-89-MS, Aug. 1989, 88 pages.
Corte-Real et al., "Network flow models for the local access network expansion problem," Computers & Operations Research vol. 34, 2007, pp. 1141-1157.
Bauer, "Bundling, Differentiation, Alliances and Mergers: Convergence Strategies in U.S. Communication Markets," Communications & Strategies, No. 60, Dec. 2005, online at http://mpra.ub.uni-muenchen.de/2515/, pp. 59-93.
Balakrishnan et al., "Models for Planning the Evolution of Local Telecommunication Networks," Massachusetts Institute of Technology Operations Research Center working paper, OR195-89, May 1989, 80 pages.
"Smart meter," http://en.wikipedia,org/wiki/Smart_meter, Nov. 10, 2009, 4 pages.
Smart Grid Northwest, "Qualitrol," http://smartgridnw.org/membership/member-organizations/qualitrol/, accessed Oct. 13, 2015, 3 pages.
Artem Katasonov, et al., "Smart Semantic Middleware for the Internet of Things", Jan. 2008, 11 pages.
Andrea Zanella, et al., "Internet of Things for Smart Cities." IEEE Internet of Things Journal, vol. 1, Iss. 1, Feb. 2014, pp. 22-32.
Dieter Uckelmann, et al., "An Architectural Approach Towards the Future Internet of Things." Architecting The Internet of Things, Springer-Verlag Berlin Heidelberg, 2011, pp. 1-24.
Ning Zhong, et al., "Research challenges and perspectives on Wisdom Web of Things (W2T)." The Journal of Supercomputing, Nov. 26, 2010, 21 pages.
Detlef Zuehlke, "SmartFactory—Towards a factory-of-things." Annual Reviews in Control, 34.1, Mar. 28, 2010, pp. 129-138.
Jiang, R. et al., "Energy-theft detection issues for advanced metering infrastructure in smart grid," IEEE, Tsinghua Science and Technology, vol. 19, Issue 2, Apr. 15, 2014 (16 pages).
Blumsack, S. et al., Abstract of "Ready or not, here comes the smart grid!" Energy, vol. 37, Issue 1, Jan. 2012 (pp. 61-68).
McLaughlin, S. et al., "Energy theft in the advanced metering infrastructure," Abstract, Critical Information Infrastructures Security, Sep. 30, 2009 (pp. 176-187).
Amin, R. et al., "Roadmap to Smart Grid Technology: A Review of Smart Information and Communication System," International Journal of Control and Automation, vol. 7, No. 8, 2014, pp. 407-418.

(56) References Cited

OTHER PUBLICATIONS

Elyengui, S. et al., "The Enhancement of Communication Technologies and Networks for Smart Grid Applications," International Journal of Emerging Trends & Technology in Computer Science, vol. 2, issue 6, Nov. 2013, pp. 107-115.

Qin, Z., "A Survey of Networking Issues in Smart Grid," www.cse.wustl.edu/~jain/cse570-13/ftp/smrtgrid/index.html, Dec. 20, 2013 (12 pages).

Güngör, V. et al., "Smart Grid Technologies: Communication Technologies and Standards," IEEE Transactions on Industrial Informatics, vol. 7, No. 4, Nov. 2011, pp. 529-539.

Güngör, V. et al., "A Survey on Communication Networks for Electric System Automation," Feb. 2006, available at: https://smartech.gatech.edu/bitstream/handle/1853/27879/electric_system_automation.pdf.

Zaballos, A. et al., "Heterogeneous Communication Architecture for the Smart Grid," IEEE Network, vol. 25, No. 5, Sep./Oct. 2011, pp. 30-37, available at: http://www.itk.ntnu.no/fag/TTK4545/TTK2/Pensum-filer/SmartGrid.pdf.

Clark, A. et al., "Wireless Networks for the Smart Energy Grid: Application Aware Networks," Proceedings of the International MultiConference of Engineers and Computer Scientists, vol. 2, Mar. 17-19, 2010, available at: http://www.iaeng.org/publication/IMECS2010/IMECS2010_pp1243-1248.pdf.

Parikh, P. et al., "Opportunities and Challenges of Wireless Communication Technologies for Smart Grid Applications," 2010, available at: http://citeseerx.ist.psu.edu/viewdoc/download?doi=10.1.1.453.7100&rep=rep1&type=pdf.

U.S. Appl. No. 16/372,911, filed Apr. 2, 2019, "Data Transfer Facilitation to and Across a Distributed Mesh Network Using a Hybrid TV White Space, Wi-Fi and Advanced Metering Infrastructure Construct" (43 pages).

Hafeez et al., "Smart Home Area Networks Protocols within the Smart Grid Context", Sep. 2014, Journal of Communications, vol. 9, No. 9, pp. 665-671.

Spinsante et al., "NFC-Based User Interface for Smart Environments", Feb. 24, 2015, Hindawi Publishing Corporation, Advances in Human-Computer Interaction, vol. 15, pp. 1-12.

Modoff et al., "Industry The Internet of Things", May 6, 2014, Deutsche Bank Markets Research, (102 pages).

Tuohy, Jennifer, "What is home automation and how do I get started", Jan. 26, 2015, Network World, (9 pages).

Snyder, A.F., et al., "The ANSI C12 protocol suite—updated and now with network capabilities", Mar. 2007 (available at http://horizontec.com/sccsmartgrid.2yt4/2007-03ClemsonPSC02-snyder-mtgstuber.pdf) (6 pages).

Parag Kulkarni, et al., "A Mesh-Radio-Based Solution for Smart Metering Networks", IEEE Communications Magazine, Jul. 2012, 10 pages.

* cited by examiner

INTEGRATED SOLUTIONS OF INTERNET OF THINGS AND SMART GRID NETWORK PERTAINING TO COMMUNICATION, DATA AND ASSET SERIALIZATION, AND DATA MODELING ALGORITHMS

CROSS REFERENCE TO RELATED APPLICATION

This application claims benefit to U.S. Provisional Application No. 62/375,170 filed 15 Aug. 2016, which is hereby incorporated by reference in their entirety.

The present invention forms part of, and builds on, the family of technologies disclosed in the other related applications identified below.

BACKGROUND OF THE INVENTION

Proliferation of the "Internet of Things" (IoT) is driving interconnected smart systems. In particular, smart grids are following this trend though the establishment of smart energy, gas and water management. Interconnected components are now providing an unprecedented level of intelligence supporting numerous operational actions. This landscape is ushering in vast amounts of unstructured data and the need for intelligent data parsing, analysis and action systems.

With this IoT understanding and backdrop, currently there is a need within global smart grid networks, e.g., in urban and remote locations with limited electric infrastructure, for communications with transformers, residential and commercial meters and other Internet/wireless connected IoT devices. These targeted locations do not have sufficient infrastructure to fully deploy a smart grid or Internet infrastructure.

SUMMARY OF THE INVENTION

Interconnected and non-interconnected IoT smart systems are aided by both wired and wireless sensor-rich networking technology. Smart devices are enabled by a multitude of sensors in order to identify, isolate, capture, and process data into multiple marketing sectors such as energy, health care and transportation, for example.

Smart system data management and visualization may be enabled by implementing a robust chronological portfolio of operations and strategies, moving from the associated network through a defined collection agent and ultimately to a centralized storage system where data may be queried, parsed, aggregated and ultimately visualized using a series of algorithms and graphical user interfaces.

The entirety of this construct is bi-directional, allowing both information and actions to flow into the construct and out of the construct. Actions may initiate either internally to or externally of the described construct.

The present invention provides a complete, cloud-based system. Most current advanced metering infrastructure ("AMI") systems are enterprise based or a mix of enterprise and cloud. The present invention is a completely, cloud based system, including the collection engine, communication protocol, analytics platform and cloud storage.

The present invention further provides a unique, software and hardware interaction in a cloud-based system. Most large scale cloud offerings deal with software interactions across prescribed data scheduling schemes. In such systems, the scheduling of data retrieval is automated. The construct of the present invention represents a "hybrid" system providing both prescribed data scheduling, similar to software centric systems, and hardware centric command processing at random intervals and rate. As a result, multiple devices in the smart grid network and cloud-based construct can randomly request data and visualize data on a display outside of an automated schedule. The uniqueness of the hardware interaction of the present invention enables a level of cloud design complexity not seen in traditional cloud deployments. The transformer monitoring device hardware and the mesh network established between devices in the smart grid allows the use of a cloud-centric execution in both a transactional and scheduled manner. The transformer monitoring device allows for both transactional and scheduled commands to flow both into the mesh network and out of the mesh network.

In accordance with a first aspect of the invention, a smart grid network is provided. The smart grid network comprises one or more transformer monitoring devices configured to collect metering data from one or more metering devices in the smart grid network. The smart grid network further comprises a cloud-based data processing and storage system comprising one or more cloud data processors configured to receive data from the one or more transformer monitoring devices and process the received data into categories including at least a first category of data comprising the collected metering data. The cloud-based data processing and storage system further comprises at least one data store configured to store data of at least the first category of data, an analytics platform configured to analyze the received and categorized data and a graphics server configured to format the analyzed data for display. The smart grid network further comprises at least one user device comprising a user interface and a display configured to display the analyzed data.

In accordance with an embodiment of the smart grid network of the first aspect of the invention, the one or more cloud data processors are configured to process the received data into the first category of data comprising transactional data including the collected metering data and at least a second category of data comprising notifications data. In one such embodiment, the one or more cloud data processors are further configured to process the transactional data into a non-relational format for storage in a non-relational database and process the transactional data in the non-relational format into a relational format for storage in a relational database. In one such further embodiment, relational database is configured to transmit the stored data in the relational format to the at least one data store, and the at least one data store comprises a data mart configured to store data for a predetermined period of time, and a backup storage configured to provide a backup storage of the data stored in the data mart.

In accordance with a further embodiment of the present invention consistent with any of the above-described embodiments of the smart grid network of the first aspect of the invention, the one or more cloud data processors are further configured to transmit the notifications data to a short-term data storage prior to displaying the notifications data on the at least one user device.

In accordance with a further embodiment of the present invention consistent with any of the above-described embodiments of the smart grid network of the first aspect of the invention, the cloud-based data processing and storage system further comprises a collection engine in communication with the one or more transformer monitoring devices, the one or more cloud data processors, the analytics platform and the at least one user device. In one such embodiment, the cloud-based data processing and storage system further comprises a scheduler configured to determine a regular time interval for the collection of data from the one or more transformer monitoring devices by the cloud-based data processing and storage system. In one such further embodiment, the one or more cloud data processors of the cloud-based data processing and storage system are further configured to transmit on demand requests for data to the one or more transformer monitoring devices outside of the regular time interval for the collection of data or to the one or more metering devices directly. In one such further embodiment, the on demand requests for metering data are initiated by one or more of the at least one user device and the collection engine.

In accordance with a further embodiment of the present invention consistent with any of the above-described embodiments of the smart grid network of the first aspect of the invention, the at least one user device is a personal computer, a mobile device, a tablet device or a head-mounted display device configured to display the analyzed data using an augmented reality display.

Further in accordance with a further embodiment of the present invention consistent with any of the above-described embodiments of the smart grid network of the first aspect of the invention, the one or more transformer monitoring devices and the metering devices form a wireless mesh network.

In accordance with a further embodiment of the present invention consistent with any of the above-described embodiments of the smart grid network of the first aspect of the invention, the notifications data indicate the occurrence of a particular event in the smart grid network detected by the one or more transformer monitoring devices.

In accordance with a second aspect of the invention, a method is provided. The method comprises collecting, by one or more transformer monitoring devices in a smart grid network, metering data from one or more metering devices in the smart grid network; transmitting data collected by the one or more transformer monitoring devices to a cloud-based data processing and storage system; receiving, by one or more cloud data processors of the cloud-based data processing system, the data transmitted from the one or more transformer monitoring devices; processing, by the one or more cloud data processors, the received data into categories including at least a first category of data comprising the collected metering data; storing, in at least one data store of the cloud-based data processing and storage system, data of at least the first category of data; analyzing, by an analytics platform of the cloud-based data processing and storage system, the received and categorized data; formatting, by a graphics server of the cloud-based data processing and storage system, the analyzed data for display; and displaying the analyzed data on at least one user device comprising a user interface and a display.

In accordance with an embodiment of the method of the second aspect of the invention, processing the received data into categories comprises processing the received data into the first category of data comprising transactional data including the collected metering data and at least a second category of data comprising notifications data. In one such embodiment, the method of the second aspect of the invention further comprises a further processing, by the one or more cloud data processors, of the transactional data into a non-relational format for storage in a non-relational database, and a further processing of the transactional data in the non-relational format into a relational format for storage in a relational database. In one such further embodiment, the method further comprises transmitting, by the relational database, the stored transactional data in the relational format to the at least one data store, and the at least one data store comprises a data mart configured to store data for a predetermined period of time, and a backup storage configured to provide a backup storage of the data stored in the data mart.

In accordance with a further embodiment of the present invention consistent with any of the above-described embodiments of the method of the second aspect of the invention, the method further comprises transmitting, by the one or more cloud data processors, the notifications data to a short-term storage prior to displaying the notifications data on the at least one user device.

In accordance with a further embodiment of the present invention consistent with any of the above-described embodiments of the method of the second aspect of the invention, the cloud-based data processing and storage system further comprises a collection engine in communication with the one or more transformer monitoring devices, the one or more cloud data processors, the analytics platform and the at least one user device. In one such embodiment of the method of the second aspect of the invention, the method further comprises determining, by a scheduler of the cloud-based data processing and storage system, a regular time interval for collecting data from the one or more transformer monitoring devices by the cloud-based data processing and storage system. In one such further embodiment of the method of the second aspect of the invention, the one or more cloud data processors of the cloud-based data processing and storage system are further configured to transmit on demand requests for data to the one or more transformer monitoring devices outside of the regular time interval for collecting data or to the one or more metering devices directly.

DETAILED DESCRIPTION OF THE INVENTION

The overall smart power grid network according to the present invention represents an interconnected so-called "BIG DATA" technology system providing advanced intelligence and synergistic components across power metering, distribution and communication, optimization and installation and servicing. The network incorporates discrete elements in the transformer monitoring and communications, residential and commercial metering and analytical, predictive and pre-emptive software algorithms. The hardware associated with the network facilitates communications with transformers, residential and commercial meters, and other Internet/wireless connected devices (commonly referred to as the "Internet of Things" (IoT)). The network's geographically disbursed assets support a wireless mesh network communications extension, while aiding system optimization capabilities, noting that many assets are in logistically difficult areas to reference, re-locate, interrogate and service. The overall integrated system drives substantial efficiencies in data visualization, evaluation, diagnosis, optimization, and servicing using enhanced reality systems across this interconnected smart grid network and similar networks. The collective systems provide a synergistic and unique alternative network for BtB/BtC data receipt, delivery and monetization.

Figure 1A:
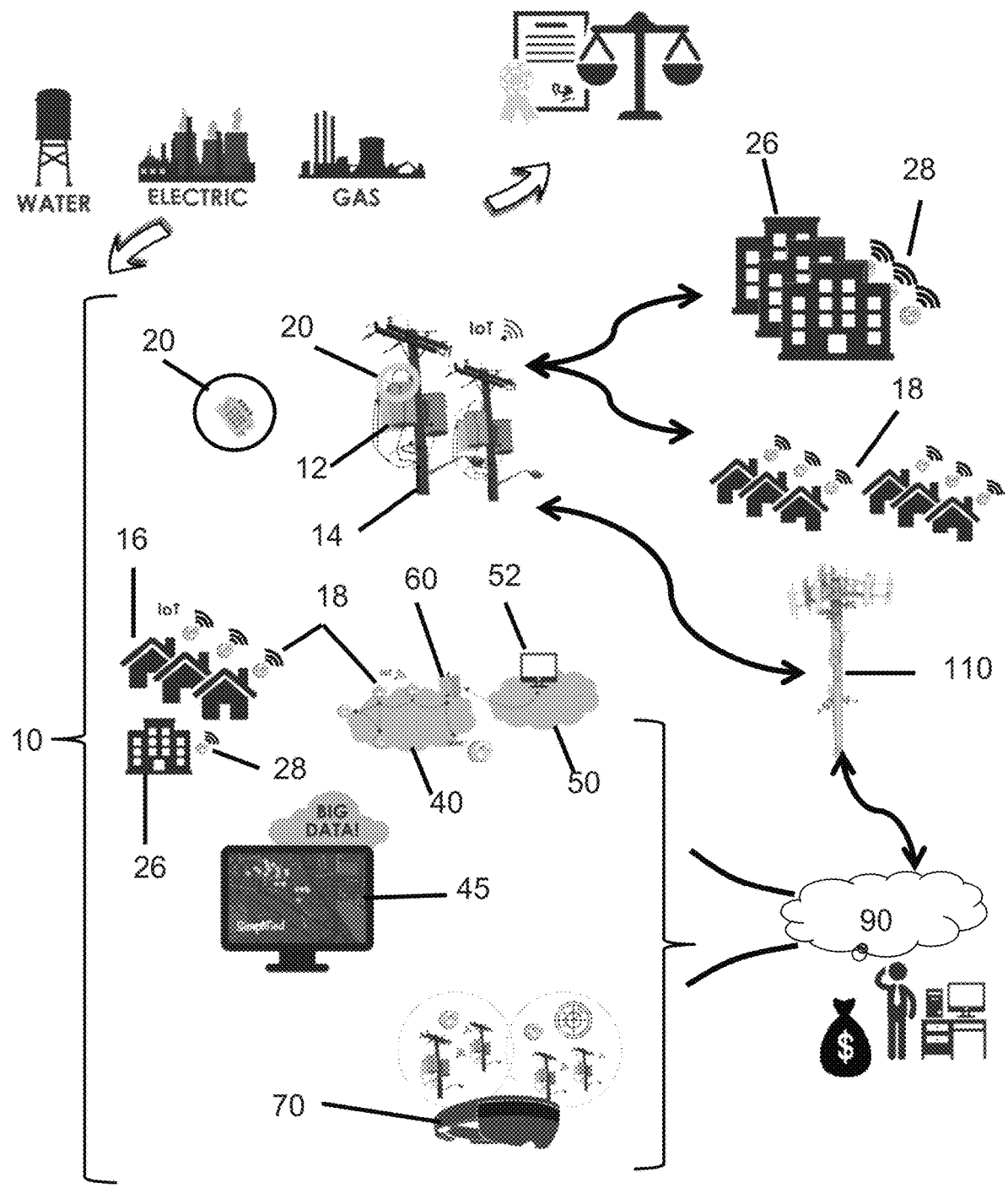
FIG. 1A is a diagram showing an establishment of a baseline, power grid centric, smart utility mesh network, according to some embodiments of the present invention.

An example of an implementation of a smart grid network 10 is shown in FIG. 1A. The smart grid network 10 according to the present invention represents a singular, standardized, and scalable network, providing the industry's first inclusive solution from a singular supplier. The smart grid network 10 may incorporate a utility financials rebalancing, and incorporate utility customers and IoT adjacencies. The smart grid network 10 is inclusive of four basic technology elements. The primary hardware and software constituents of the network are as noted and identified below.

1. The pole or pad mounted transformer monitor/smart data collector device is identified herein as element 20, according to the present invention (AKA "HyperSprout™"), which is the localized data aggregation and power flow investigation; establishing a data capture and delivery capability wherever there is power, e.g., consistent with that set forth herein.

2. A digital data and delivery and receipt mesh network (AKA "DataVINE™") is identified herein as element 40, which is a ubiquitous mesh network facilitating automated residential and commercial metering while deploying an alternative data delivery capability; enforcing a market-leading 100% meter read capability, e.g., consistent with that set forth in U.S. application Ser. No. 15/250,119.

3. A smart node power grid analytics platform (AKA "DataSCAPE™"), identified herein as element 45, which provides for a comprehensive nodal exchange analysis of all grid parameters; realizing an inclusive geo-spatial understanding of utility operations, e.g., consistent with that set forth in U.S. provisional application Ser. No. 62/375,170.

4. A head-mounted user device 70 for enhanced reality field investigation, interaction and servicing; deploying the industry's first "virtual" utility (AKA "PowerVISR™"), e.g., consistent with that set forth in U.S. patent application Ser. No. 15/234,293.

The smart grid network 10 and the mesh network 40 enabled by the transformer monitor device 20 and other network devices provide network access to an end user. Additionally, the end user may use the established network for the purpose of storing and retrieving data and files from a cloud-based server 90.

By way of example, FIG. 1A shows an example of a smart power grid network generally indicated as 10, according to some embodiments of the present invention. The smart power grid network 10 may take the form of, or may be configured to include, one or more digital data and delivery and receipt mesh networks like element 40. Each digital data and delivery and receipt mesh network 40 may include one or more communication nodes such as the transformer module or device 20 for exchanging information upstream and downstream between the communication nodes and a central location, e.g., which takes the form of the private network 50 in FIG. 1A. The one or more communication nodes may be configured to be able exchange such upstream and downstream information between themselves in order to exchange such upstream and downstream information between a respective communication node and the central location like element 50.

In FIG. 1A, the smart power grid network 10 may include transformers like element 12 for providing electric energy to residential homes and commercial buildings like elements 16, 26, each having a respective electrical meter like elements 18, 28 for measuring the associated electrical energy usage. The smart power grid network 10 may also include transformer monitor/data collection devices 20 configured to collect data about the electrical energy usage in relation to residential homes and commercial buildings 16, 26 from the respective electrical meter like element 18, 28. For example, each electrical meter 18, 28 may provide metered data signaling containing information about metered data related to associated electrical signaling being supplied from the transformer 12 to the building or structure 16, 26 in the grid network 10. Moreover, transformer monitor/data collection devices 20 may receive associated signaling containing information about electrical signaling data related to electricity being processed by the transformer 12 located and arranged in the grid network and to which the transformer monitoring device 20 is mounted, as well as other wireless network data related to other communication nodes forming part of other wireless network devices deployed in the grid network. In effect, the collected data received by the transformer monitor device 20 may include some combination of the electrical signaling data related to the transformer, the metered data related to the electrical meter and/or the other wireless network data related to other communication nodes in the grid network, e.g., which may include digital content as set forth in further detail below.

The transformer monitor/data collection devices 20 may also be configured to provide suitable signaling containing information about the collected data to the private network 50 via the digital data and delivery and receipt mesh network 40. The private network 50 may be configured as a central point that processes the collected data, e.g., performing utility analysis that may include one or more of the following: delivery subtraction analysis, proactive asset monitoring, distribution asset utilization, T and D subtraction analysis, energy audits and analysis, load control, geographic localization and define pro-active and pre-emptive asset efficiency or operational activities. By way of example, the utility analysis may be performed in an effort to increase efficiency, decrease costs, increase profits and/or community engagement related to the operation of the smart grid network 10.

The pole 14 mounted transformer monitoring device 20 may be configured in communication with the electrical meter 18 associated with the residential home 16. By way of example, the electrical meter 18 may be configured to measure single phase electrical energy provided by the transformer 12 along a single phase utility line to the residential home 16.

In comparison, the pole 14 mounted transformer monitoring device 20 may also include, or take the form of, a pad mounted transformer device in communications with an electrical meter 28 associated with a commercial building 26 or home. By way of example, the electrical meter 28 may be configured to measure three phase electrical energy provided by a pad transformer along a three phase utility line to the commercial building 26 or home.

FIG. 1A shows that the transformer monitoring device 20 may be configured to collect data related to some distribution related functionality, e.g., including determinations related to outage, momentary outage, voltage/VAR, and/or transformer monitoring. The transformer monitor device 20 may be configured to collect data related to some voltage analysis, DRM functionality and energy theft functionality in relation to its associated residential home or commercial building. The transformer monitor device 20 can provide the suitable signaling containing information about the collected data to the private network 50 via the digital data and delivery and receipt mesh network 40. The collected data received by the private network 50 may also be analyzed in relation to conservation, load curtailment and/or a demand response vis-a-vis the power utility. In FIG. 1A, the private network 50 may include a private network computer and monitor generally indicated as 52 for performing or implementing the aforementioned analysis and functionality.

FIG. 1A shows that the digital data and delivery and receipt mesh network 40 may include other transformer monitor devices like element 20 exchanging information with other meters like elements 18, 28 associated with other buildings or structures like elements 16, 26. FIG. 1A also shows a relay 60 coupled between the digital data and delivery and receipt mesh network 40 and the private network 50.

The present invention represents a new and unique inclusion of wireless communications and data transmission capability into transformer monitoring modules like element 20, transformer monitoring being a core component within a so-called smart grid network like element 10. These transformer modules 20 may be mounted directly to utility transformers 12 or utility poles 14 in the field and include the capability to both collect and transmit information from the transformer 12, residential and commercial meters like element 18 and other Internet/wireless connected devices in the network 10. The transformer module or device 20 according to the present invention differs from other existing technology by incorporating a transceiver, transmitter and antenna collectively within the same device to both collect data from other network devices, including other transformer modules 20 or smart assets, deployed in the field and communicate collected data back to a central location like element 50 or other connected devices like other elements 20 whilst building a Wireless Wide Area Network (WWAN), deployed in a mesh network topology.

The aforementioned overall combination provides an infinitely scalable data delivery and receipt capability for communities with poorly established, historical infrastructure while providing a synergistic network capability to those communities with current or anticipated cellular, satellite, optical or other capability.

Once established, the smart grid network implementation and the associated transformer module and mesh network hardware and software assets may be easily expanded to allow for integration with both smart city infrastructure 16, 26 and home automation smart devices. For example, inclusion of a smart grid network communications chip set for implementing smart grid network communications chip set signal processing functionality into locally deployed smart assets allows for both the capture and communications of digital information both to and from these smart asset devices. By way of example, these smart asset devices may include, or take the form of, set top boxes having the smart grid network communications chip set contained therein, e.g., for communicating with a transformer module like element 20, or for communication with the so-called cloud-based server 90. In areas of established infrastructure, this capability allows for the localized capture and communications with smart devices within the geographical confines of the mesh network smart network like element 10. In areas where coordination is required outside of this localized network, a back-end cellular capability may be utilized, like the back-end cellular functionality associated with a back-end cellular tower like element 110. In peri-urban and rural areas of extremely poor infrastructure and cellular service, the smart grid network deployed system provides a competitive and less costly alternative to dedicated cellular infrastructure and may be paired with various wireless transmissions medias including cellular, satellite, optical or other wireless transmissions media either now known or later developed in the future.

The mesh network 40 described herein is an open network, such that those within the geographic region of operation will opt-in if desired, through the utility company, telecommunications partner or local ISP partner administering the network. The network is not closed to any individuals opting in, provided they have been authenticated using the appropriate security protocols. The network is configured to support a throughput of up to 600 Mbps, as noted in the appropriate IEEE specification, and as realized in a 802.11s wireless mesh network topology.

By way of further example, the integration with, or replacement of, local wireless network delivery systems allows the seamless integration with current home automation technology, allowing for the direct communication with these devices using the smart grid network deployed system.

Scaling of the deployed transformer modules or devices 20 with ongoing optimization of the defined mesh network 40 allows for establishing a lucrative alternative pathway for digital content receipt and delivery to networked consumers. Recognizing the proliferation of digital set-top boxes like elements from the leading consumer technology innovators, inclusion of the smart grid network chip set within these devices provides an alternative capability for digital content beyond that currently offered by cellular and broadband suppliers. The digital content may include movies, songs, photographs, advertising media, social media exchanges, internet searching requests, internet searching downloads, digital imagery, web page renderings, streaming media, online gaming, voice over internet, video over internet, email communications, business analytics, consumer analytics, industrial automation including SCADA activities, home automation, governmental and emergency related broadcasts, digital business model facilitation, including on-line commerce.

Figure 1B:
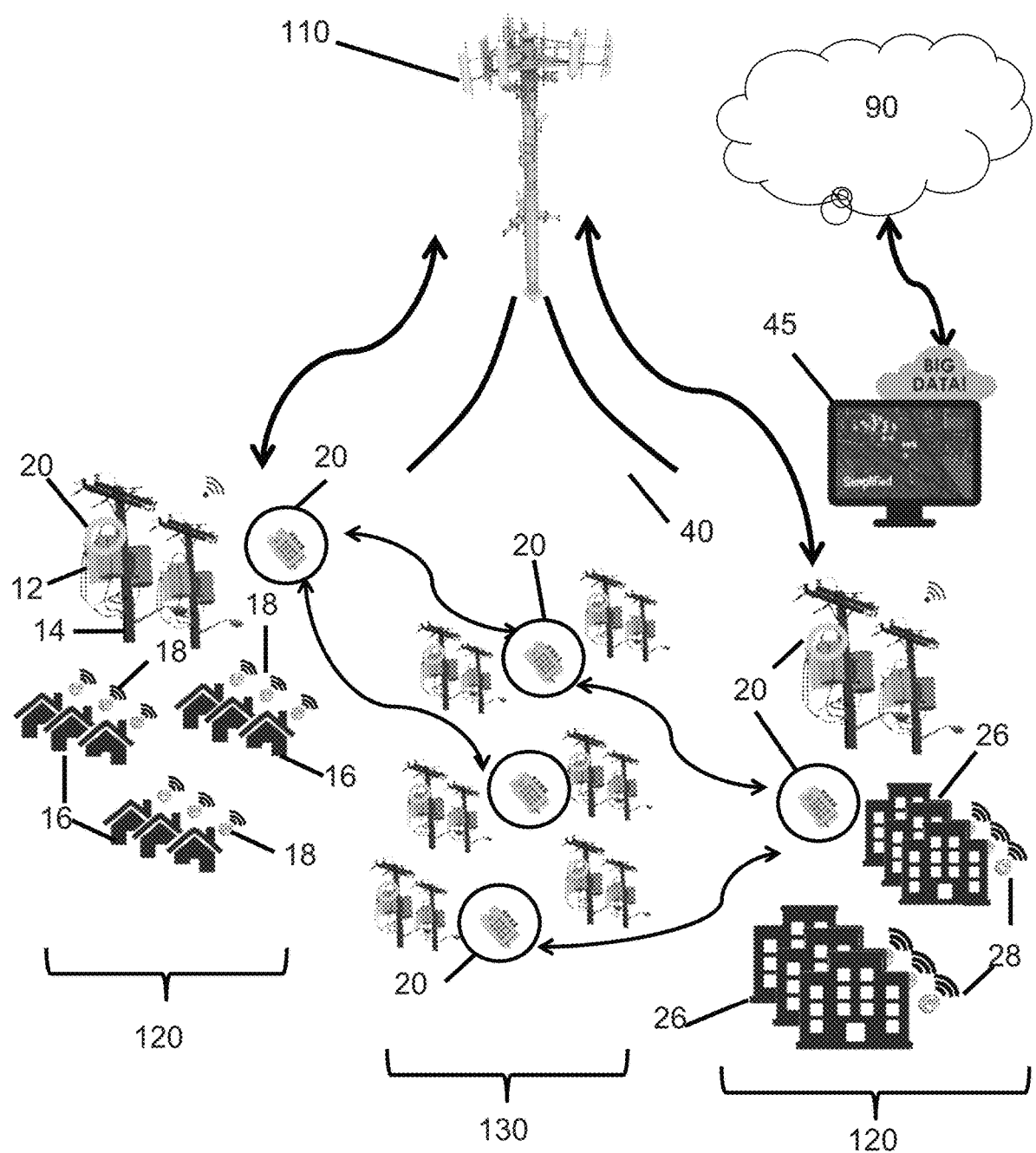
FIG. 1B is a diagram of a mesh network comprising two versions of the transformer monitoring device hardware in accordance with an embodiment of the present invention.

FIG. 1B shows an example of a mesh network with two versions of the transformer monitoring device 20.

The first version 120 includes both a collector chip set and a mesh/cellular chip set. It communicates with the head-end (e.g., cellular tower 110), while pulling smart meter data and transformer data the devices of the second version 130 and other mesh network data.

The second version 130 includes only the mesh/cellular chip set. It communicates with the devices of the first version 120 while pulling data.

Data flow in the smart grid mesh network may be as follows. Data collected at a smart meter 18, 28 is transmitted through the wireless wide area mesh network to a transformer monitor/data collection device 20. The data is transmitted then to a head-end, such as cellular tower 110, from which is transmitted to the cloud-based server 90. The data can then be analyzed using a smart node power grid communication protocol and analytics platform 45. Metered data may also be collected from gas meters, water meters, or any other type of resource measurement meter, and transmitted to a transformer monitor/data collection device 20 for transmission through the wireless mesh network 40.

The data lineage of the "Internet of Things" and other corresponding data applications incorporates multiple formats and consumption schemes including standardized regulatory and industry data structures, voice, and unstructured data from sensor driven smart nodes. Smart nodes, in particular, are equipped with micro-controllers, processors, storage, and communication modules enabling data consumption and transmission in both simple peer-to-peer networks and advanced mesh networks. One such wireless mesh network is a 802.11s mesh network described previously and shown in FIGS. 1A and 1B. The collection engine provides flexibility in defining, managing and reporting custom data structures interacting with nodes and their associated smart devices as they pass through the communications framework.

Figure 2:
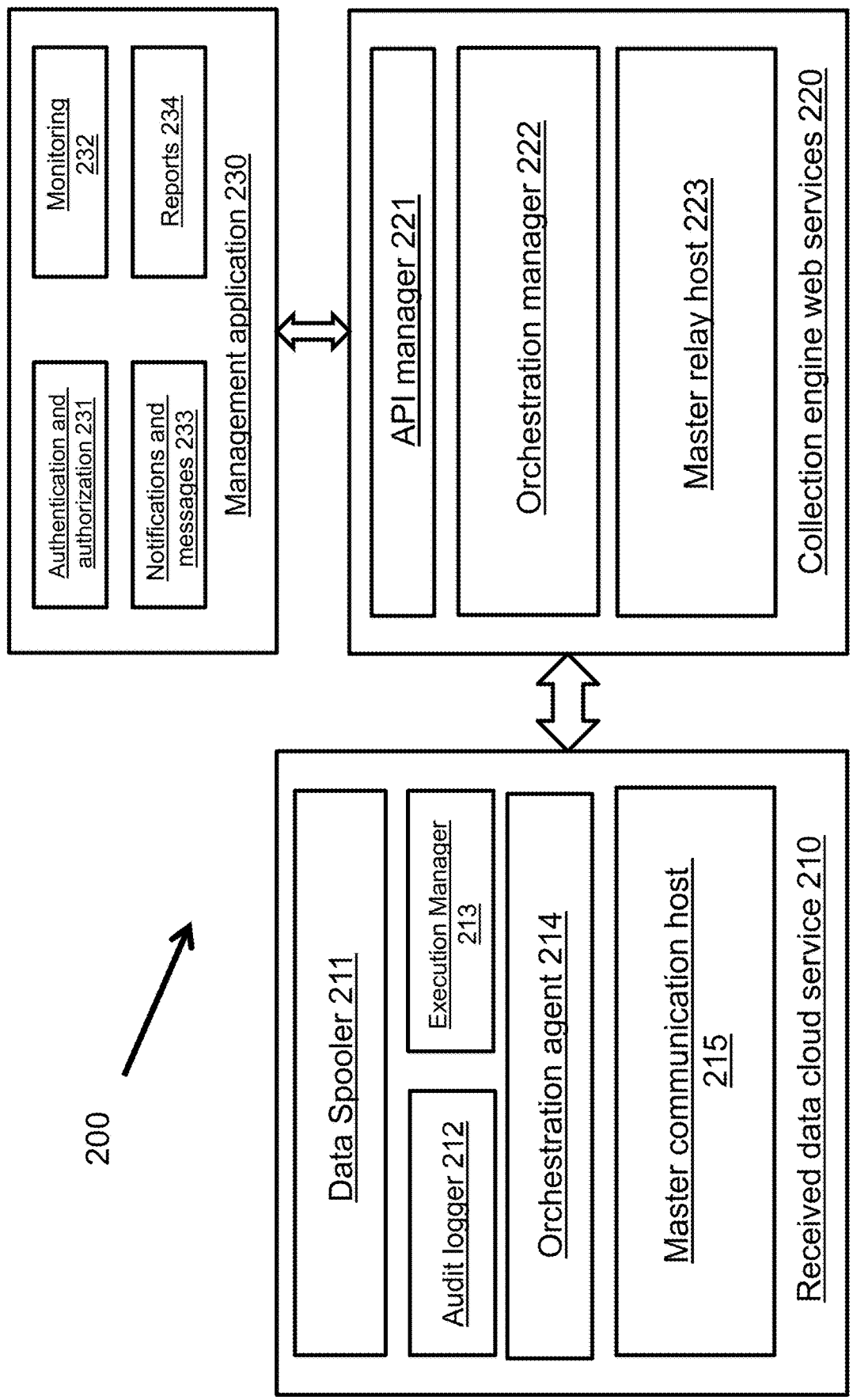
FIG. 2 is a diagram of a collection engine in accordance with an embodiment of the present invention.

Node communications are governed via a collection engine 200, which assigns and commissions various elements of the smart grid network, with authorization to participate in and transmit data through the wireless network. An example of the collection engine 200 is illustrated in FIG. 2. The collection engine 200 is configured to wirelessly manage devices in the mesh network, such as transformer monitoring devices. The collection engine 200 is configured to send commands and data to, and receive data from, devices in the mesh network, such as the transformer monitoring devices. For example, the collection engine 200 may send commands to change a configuration of a transformer monitoring device or send firmware to a transformer monitoring device.

The collection engine 200 includes three primary elements: a received data cloud service 210, collection engine web services 220, and a management application 230, which are all located in a cloud-based computing environment. Different elements within the smart grid network are managed via the management application 230. The management application 230 works with the collection engine web services 220 and received data cloud service 210 to affect changes, updates and actions within the smart grid network and its associated devices. The collection engine 200 may comprise one or more processors and one or more memory or other non-transitory storage device that are configured to store data, and also instructions, which when executed by the one or more processors, cause the one or more processors to perform the various functions discussed herein.

The received data cloud service 210 includes a data spooler 211, audit logger 212, execution manager 213, orchestration agent 214 and a master communication host 215. The collection engine web services 220 include an API manager 221, an orchestration manager 222 and a master relay host 223. The management application 230 includes an authentication and authorization block 231, a monitoring block 232, a notifications and messages block 233 and a reports block 234.

The mesh network framework coupled with the 802.11s wireless mesh nodal network enables the data and communication service wrapper mechanism that is ported across nodes, communication layers and data layers. The service wrapper enables data block transmission across sensors and corresponding information systems.

In summary, the mesh network enables real-time visualization of integrated GIS and asset information through the communication framework.

Figure 3:
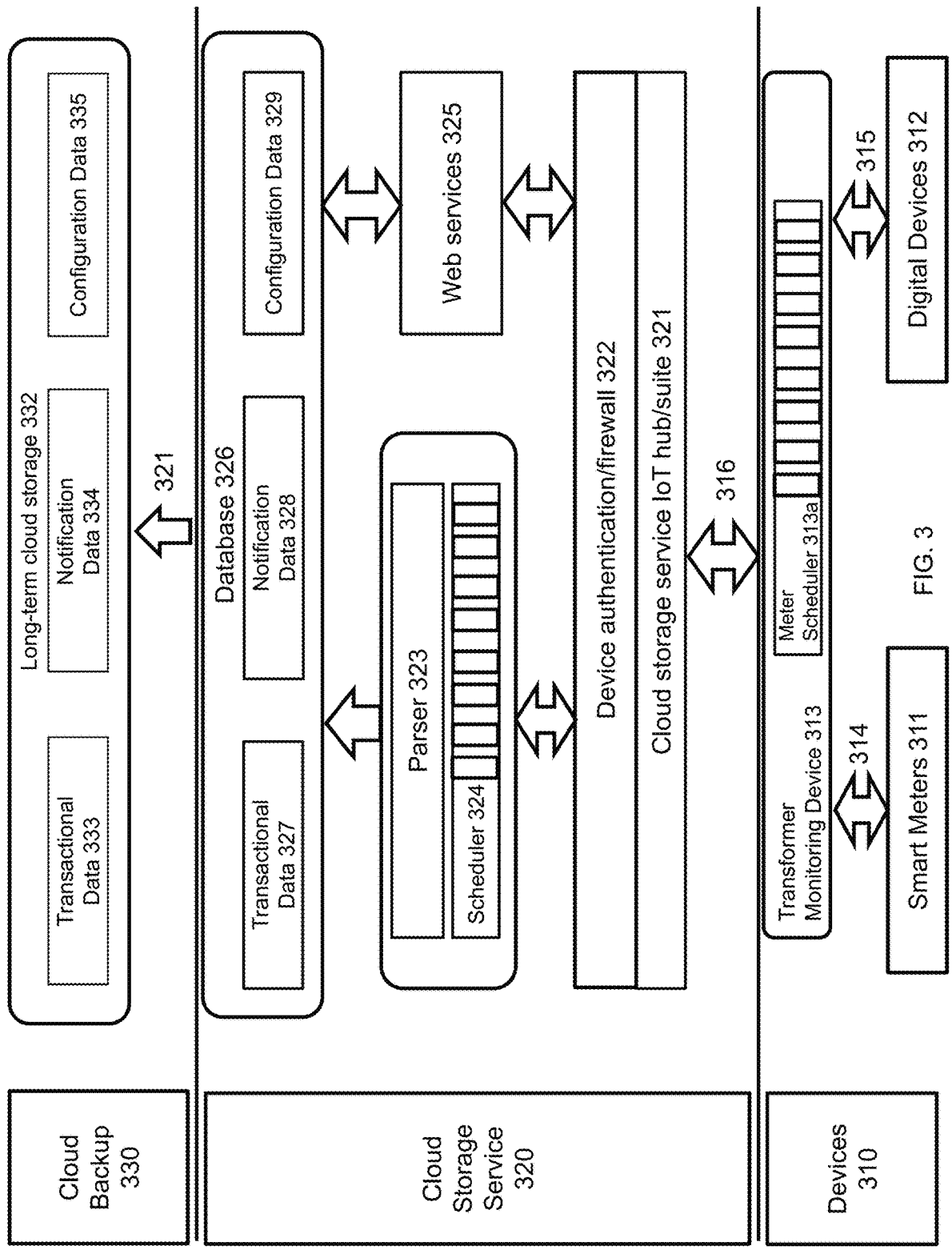
FIG. 3 is a diagram of a framework for a smart grid network in accordance with an embodiment of the present invention.

As illustrated in FIG. 3, data lineage follows a framework starting from a physical point of inception, such as physical devices 310. Data passes through collection engine managed devices moving into a cloud storage service 320 and to a cloud backup 330. The entire system is bi-directional allowing for a query and multiple follow-on queries to devices located throughout and interacting with the smart grid network.

The physical devices 310 can include smart meters 311 and digital devices 312 that are within the smart grid mesh network. The smart meters 311 and digital devices 312 transmit data to and receive data from a transformer monitoring device 313 via a secure channel 314 and a secure or open channel 315, respectively. The transformer monitoring device 313 may comprise a meter scheduler 313a that is configured to schedule and control the collection of data from the smart meters 311 and digital devices 312. Data is transmitted bidirectionally between the transformer monitoring device 313 and the cloud storage service 320 by way of a communication link 316, which can be any number of communication formats, including 3G, 4G, LTE, 5G, fiber optic, satellite, optical, or any other communication format. The cloud storage service 320 comprises a cloud storage service IoT hub/suite 321 and a device authentication/firewall 322 that is configured to prevent unauthorized access to the cloud storage service 320. The cloud storage service 320 also includes a parser 323 and a scheduler 324, which is configured to schedule and control the transmission of data from the transformer monitoring device 313 to the cloud storage service 320. Web services 325 are provided relating to notifications, alarms and events data that are provided from the transformer monitoring device 313. A database 326 with a back-up may store transactional data 327, notification data 328 and configuration data 329 that are provided from the transformer monitoring device 313. The database 326 may be synced 331 multiple times per day with long-term cloud storage 332 of the cloud backup 330. The long-term cloud storage 332 is configured to store transactional data 333, notifications data 334 and configuration data 335.

The cloud integration enables the managing of multi-tenant and single-tenant schemas in a distributed framework while retaining the integrity of the managed data with multi-layer validation mechanisms. The cloud integration will automatically route data through the appropriate schemas.

Figure 4:
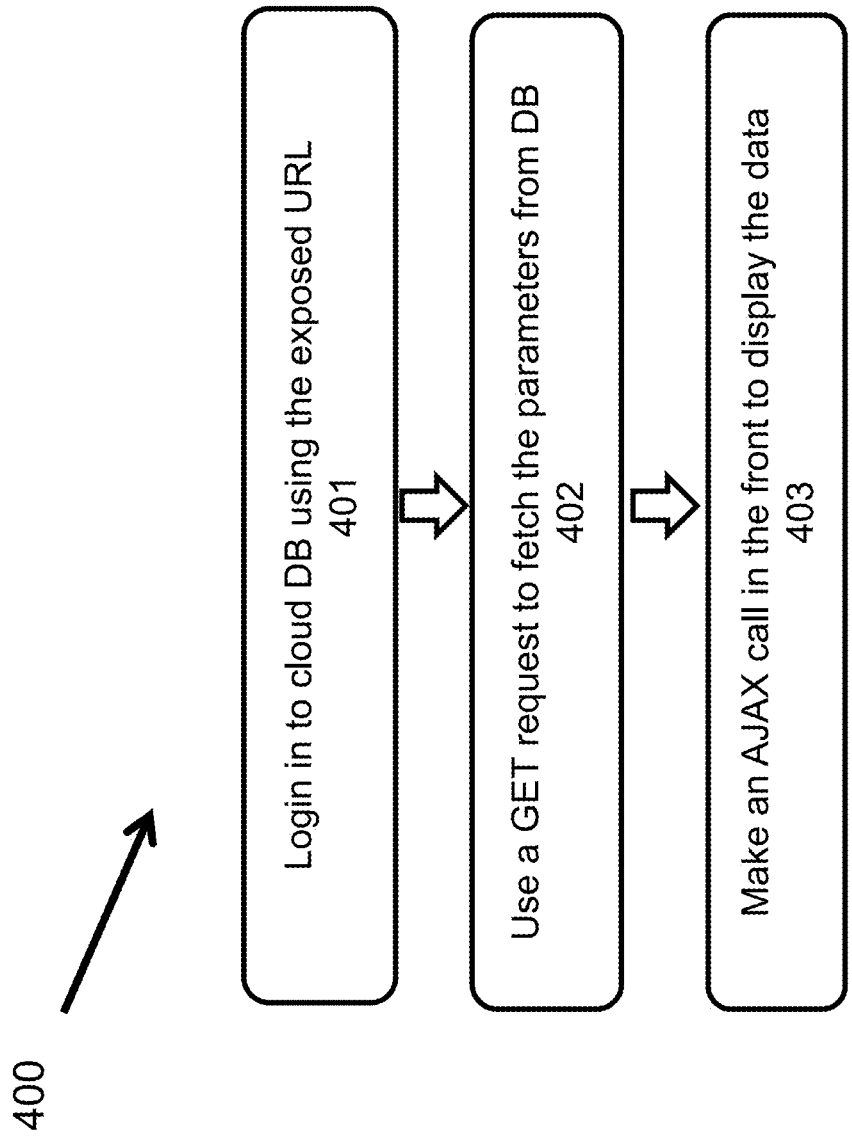
FIG. 4 is a diagram of a process for visualizing data using a cloud-based system in accordance with an embodiment of the present invention.

Data facilitation around the cloud based structure is as noted in FIG. 3. Transitioning of the data directly from the cloud based structure to the point of data visualization and action is typically completed through a process 400 of database queries and AJAX calls, as illustrated for example in FIG. 4. In a first step 401, the cloud database is logged into at a user device using an exposed URL. In a second step 402, a GET request is used to fetch the parameters from the database. In a third step 403, an AJAX call is made in the front to display the data on the user device.

Figure 5:
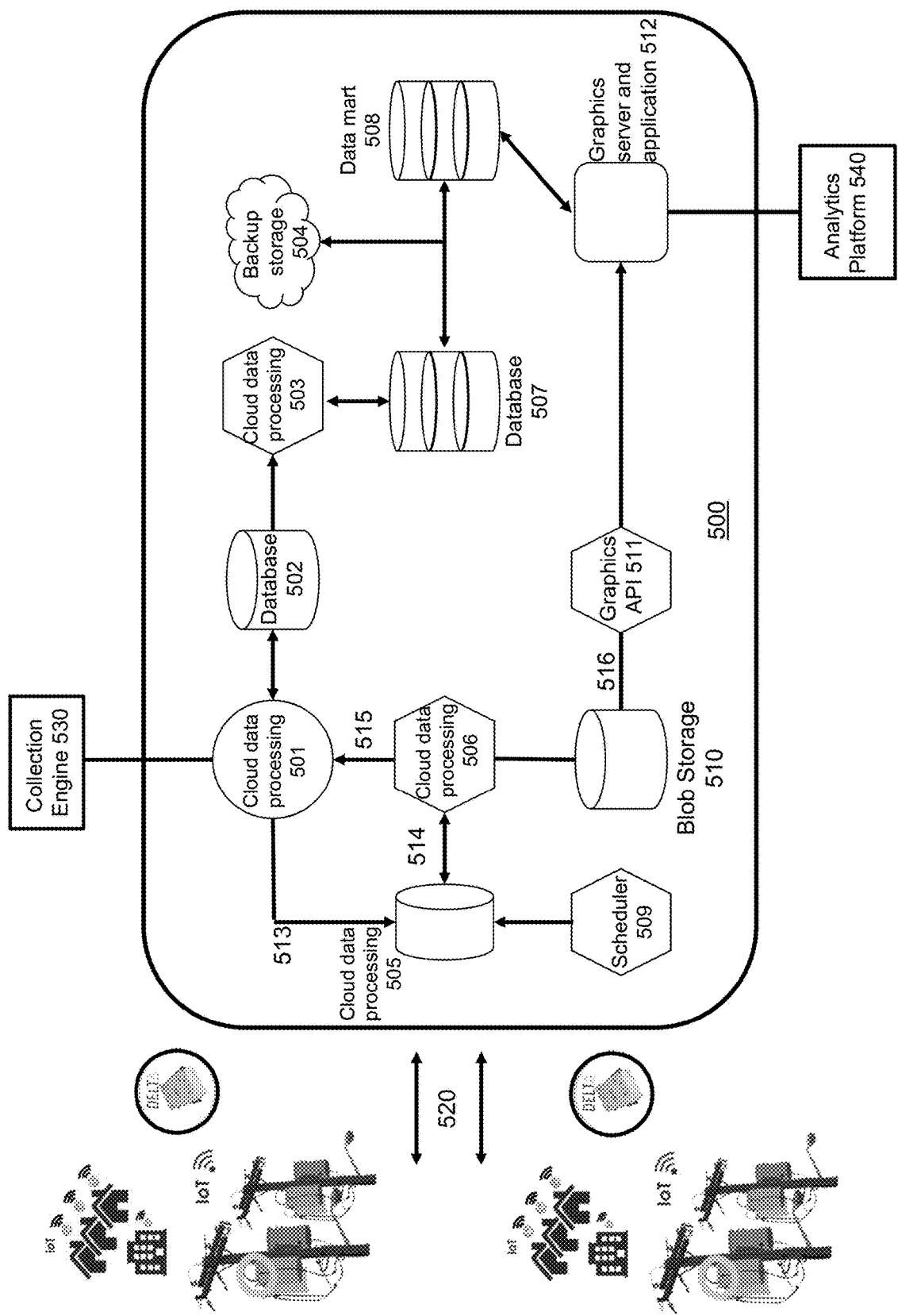
FIG. 5 is a diagram of a cloud system integration with a smart grid network in accordance with an embodiment of the present invention.

A full overview of the cloud integration involves both the scheduling of data queries and the random, ad-hoc inquiry into specific assets through the smart grid network. An overview of this system is shown for example in FIG. 5. This unique capability is required to address on-demand remote reads of devices in the smart grid network, such as remote reads of a transformer monitoring device receiving meter data from a plurality of smart meters or remote reads of smart meters directly, disconnects and re-connects between devices in the smart grid network and random asset queries from devices in the smart grid network, such as transformer monitoring devices, collection engines, and users of the analytics platform, such as end users, utility providers and administrators.

Data 520 is transferred between transformer monitoring devices 20 in a smart grid network and a cloud-based data processing and storage system 500. The data 520 from the transformer monitoring devices 20 includes transactional data and notification data. The cloud-based data processing and storage system 500 includes cloud data processing 505 that is configured to receive the data 520 from the transformer monitoring devices 20, and provide the data 514 to a further cloud data processing 506. The cloud data processing 505 operates as a messaging queue in the retrieval of data 520 from the transformer monitoring devices 20 and in the transmitting of requests for the data 520 from the transformer monitoring devices 20. The cloud data processing 506 is configured process messages that are queued up in the cloud data processing 505 and to determine whether data is transactional data or notifications data, and to separate the transactional data 515 and the notification data 516. Transactional data 515 includes data collected by the transformer monitoring devices 20 from other devices in the smart grid network, such as meter usage information from electric meters, gas meters, water meters, oil meters, and the like. The transactional and notifications data 520 may be collected from the transformer monitoring devices 20 at predetermined time intervals that are set by a scheduler 509. The scheduler 509 may set or determine the predetermined intervals based on input or instructions from, for example, an administrator device or a utility operator. How often the scheduler 509 requests transactional data can be controlled by the collection engine 530.

The cloud data processing 501, and other elements of the cloud-based data processing and storage system 500 or smart grid network, may also send an on demand request 513 to the cloud data processing 505 to obtain data 520 from the transformer monitoring devices 20 outside of the intervals set by the scheduler 509. The requests 513 can be initiated from any number of devices, including the collection engine 530 or end user devices of the analytics platform 540, such as administrators, utility operators or field technicians. For example, a request 513 for transactional data can be sent or initiated by the collection engine 530 or the analytics platform 540.

The transactional data 515 is provided to a cloud data processing 501, which processes the data and may provide the data to the collection engine 530. Cloud data processing 501 can pull stored data out of data storage in the could system 500, from non-relational database 502 for example, for providing to the collection engine 530. Cloud data processing 501 may process the data to begin transactional coding and assignment to specific database locations, and also provides the processed data to a non-relational database 502, where the data is stored in a non-relational format. The non-relational database 502 holds the processed transactional data, until it is provided to a further cloud data processing 503, which is configured to organize the data and process and reformat the data into a relational data format for storage in a relational database 507. The relational data stored in the relational database 507 may be transferred to a data mart 508 for storage of a limited duration, such as thirty days. The data mart 508 may include a server or other storage device. The relational data may also be transferred from the relational database 507 or data mart 508 to a backup storage 504, which may include a server or other storage device. The relational database 507 and non-relational database 502 can incorporate relational and non-relational databases known in the art.

Figure 7:
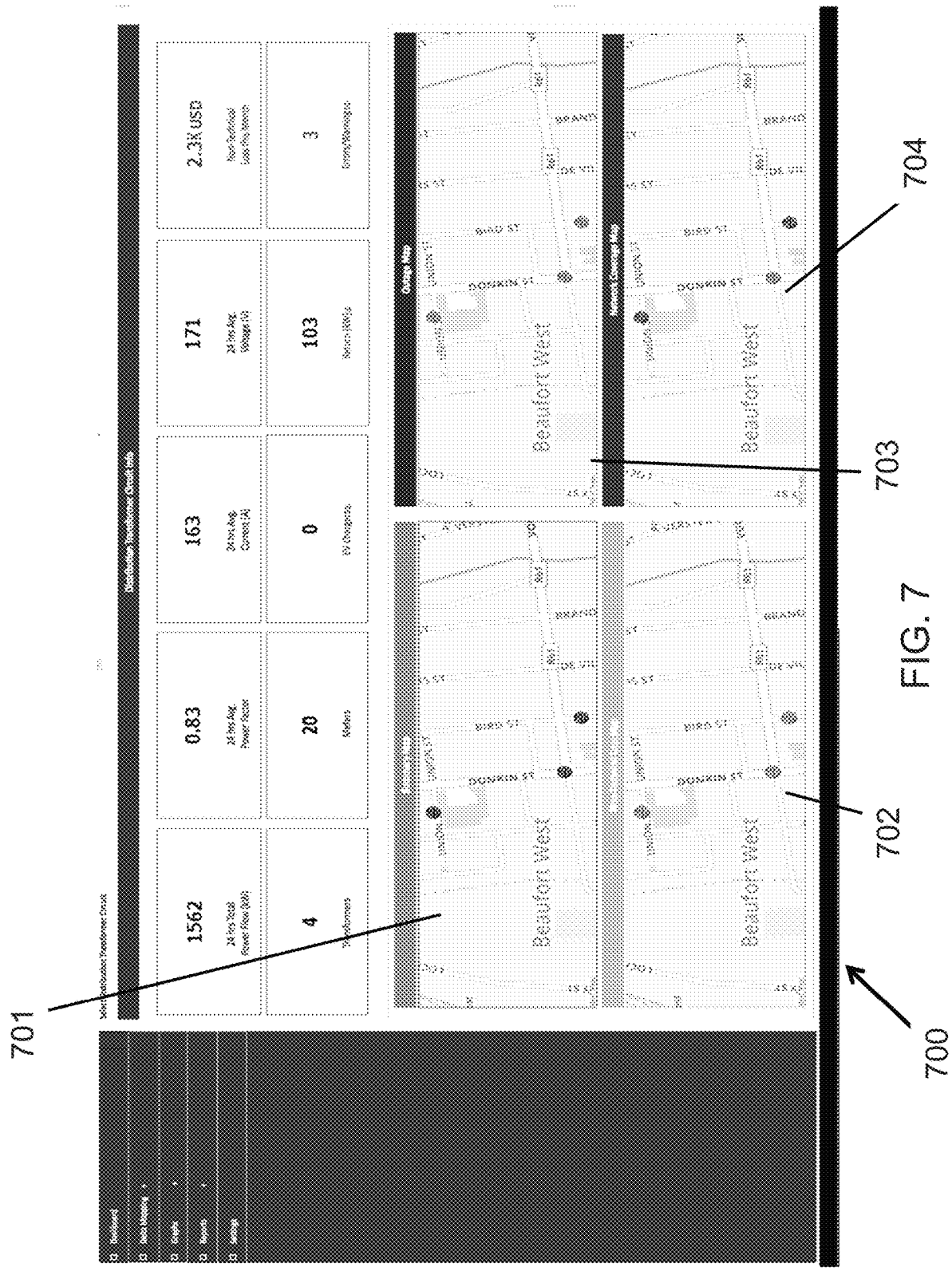
FIG. 7 shows a visualization dashboard for display on a user interface device in accordance with an embodiment of the present invention.

The notification data 516 from the transformer monitoring devices 20 includes alerts and alarms of various events, such as if there is an electrical outage or an energy diversion occurrence. Transmission of notification data can be initiated for example by a request from the scheduler 509 or from assets in-field, such as the transformer monitoring devices 20 or the electrical meters. The cloud data processing 506 is configured to provide the notification data 516 to blob storage 510 for short term storage. The notification data 516 is then provided to an invoke graphics application program interface (API) 511, which initiates a graphics server and application 512. The graphics server and application 512 may take raw data, such as notification data 516 or transactional data, with correct assignments as to names and relationships already assigned, and assign the data to specific graphical representations within the visualization scheme of the analytics platform 540 to be accessed by a user device. As illustrated in FIG. 7 for example, the graphical representations may include a dashboard 700 that is visualized for display on a user devices, including a system summary screen 701 with data mapped onto a visual map, a non-technical loss summary screen 702 with data highlighted to a specific asset or assets and mapped onto a visual map, an outage summary screen 703 with data highlighted to a specific asset or assets and mapped onto a visual map, and a network summary screen or coverage map 704 with data highlighted to a specific asset or assets and mapped onto a visual map. The graphics server and application 512 provides the data to the analytics platform 540, and enables the visualization of the notification data 516 on a user device having a display. The graphics server and application 512 may also obtain transactional data from the data mart 508, which can also be provided to the analytics platform 540 to process the data and enables the visualization of the transactional data on a user device having a display. The graphics server and application 512 may also provide data for storage in the data mart 508 that has been prepared and optimized for viewing, for later retrieval.

The cloud system 500 can include or be accessible to the collection engine 530 and analytics platform 540, and be accessible to associated user devices for visualization of data. The collection engine 530 and analytics platform 540 are also located in a cloud environment. The analytics platform 540 enables the viewing of both operational and non-operational losses in assets and, subsequently, in revenue. The analytics platform 540 also parses, aggregates and summarizes data from adjacent IoT digital devices and mesh network-enabled systems, expanding analytics capabilities beyond smart grid applications.

The cloud system 500 and its components, such as cloud data processing 501, non-relational database 502, cloud data processing 503, cloud data processing 505, cloud data processing 506, relational database 507, scheduler 509, invoke graphics API 511, graphics server and application 512, collection engine 530 and analytics platform 540, may include one or more processors and one or more memory or other non-transitory storage device that are configured to store data, and also instructions, which when executed by the one or more processors, cause the one or more processors to perform the various functions discussed herein.

The cloud system 500 may incorporate systems and software known in the art in the implementation of cloud data processing 501, cloud data processing 503, cloud data processing 505, cloud data processing 506 and their associated processes, including for example, AZURE app service, AF-Extract, AZURE IoT Hub, AZURE IoT Function, respectively. Invoke graphics API 511 and graphics server and application 512 may also incorporate systems known in the art, including for example, a TABLEAU server, application and API. The present invention is not limited to the incorporation of these systems, but may incorporate alternative or similar hardware and software systems without deviating from the scope of the invention.

Taken collectively in the smart grid network, the analytics platform, and mesh network enabled and connected digital assets provide a unified virtual view of the Internet of Things (IoT) grid, data, corresponding data insights, and resulting data discoveries, using an innovative, geo-spatial interface and enhanced (or virtual) reality construct across multiple platforms.

Figure 6:
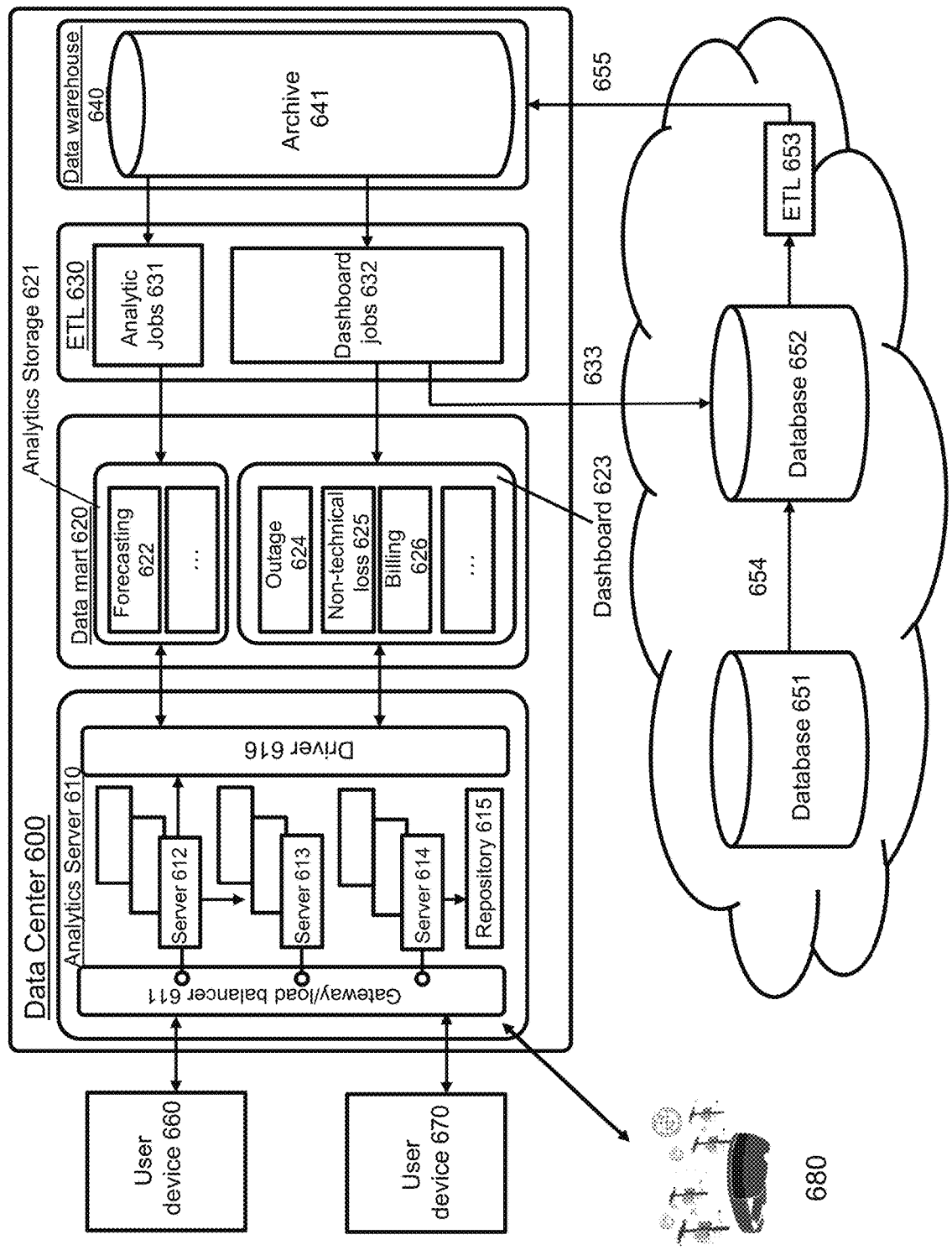
FIG. 6 is a further diagram of a cloud system integration with a smart grid network in accordance with an embodiment of the present invention.

The analytics platform integrates and engages directly with the collection engine, 802.11s wireless mesh network and cloud database structure to form a cohesive data management, rich-visualization and enterprise management solution, illustrated for example in FIG. 6.

A data center 600 comprises an analytics server 610, data mart 620, ETL (extract transfer load) 630 and data warehouse 640, all of which are arranged in a cloud-based environment. For example, the analytics server 610 may correspond to the graphics server and application 512, the data mart 620 may correspond to data mart 508, ETL 630 may correspond to the cloud data processing 503 and the data warehouse 640 may correspond to the relational database 507, all shown in FIG. 5 and discussed above.

The analytics server 610 includes a gateway/load balancer 611, data server 612, visualization server 613, app server 614, repository 615 and data source drivers 616. The data mart 620 includes an analytics storage 621, including storage of demand forecasting data 622 and storage of information that can be visualized in a dashboard 623 on a display of a user interface of the user devices 660, 670, 680. The dashboard information 623 may include outage information 624, non-technical loss information 625 and billing information 626. The ETL 630 may store analytics jobs 631 and dashboard jobs 632. The data warehouse 640 stores transaction and managerial archive data 641 for between one day and ten years. The data center 600 may be configured to communicate with and provide data for display and visualization on one or more devices, including visualization and analytics desktops 660, a web application 670 and users of head mounted devices 680 such as field technicians.

A cloud-based write intensive database 651 and read intensive database 652 are also provided. The write intensive database 651 may store transactional and managerial data for up to seven days and is replicated 654 to the read intensive database 652, which may store transactional and managerial data for up to sixty days. An ETL 653 may be backed up 655 every twenty-four hours to the data warehouse 640. The read intensive database 652 may fetch 633 live data from the ETL 630 that are not backed up.

One example of the analytic capability of the present invention may be noted in the calculation for energy theft or energy diversion. An example of such a process comprises inputs, algorithms and an output. The inputs may include a transformer serial number, transformer distributed kWh, and meter delivered kWh. The algorithms may include the aggregation transformer/feeder level and a theft calculation, which may be equal to the transformer distributed kWh, less the meter delivered kWh, and less any line loss. The output may include charts and insights, and may comprise one or more outputs, such as a number of energy theft incidents, energy loss by theft, monetary loss by theft and/or theft patterns over time.

Rich GUI visualizations which incorporate best practices from current map overlay software are used to geo-locate critical data for both the software and the hardware of a head-mounted display. In one example process for displaying data associated with a location in a smart gird network on a map of the smart grid network, in a first step, a map API is used, such as the GOOGLE map API. In a second step, a marker function is used and the array of coordinates and descriptions is passed. In a third step, the array of coordinates will be plotted in the map and the description will be shown as the information.

Other Related Applications

The application is related to other patent applications, some of which are identified above, that together form part of the overall family of technologies developed by one or more of the inventors herein, and disclosed in the following applications:

U.S. patent application Ser. No. 15/160,754, filed 20 May 2016, entitled "Transformer mounted monitor, communications and data collection device," which claims benefit to U.S. provisional application No. 62/203,101, filed 10 Aug. 2015;

U.S. patent application Ser. No. 15/234,293, filed 11 Aug. 2016, entitled "Enhanced reality system for visualizing, evaluating, diagnosing, optimizing and servicing smart grids and incorporated components," which claims benefit to U.S. provisional application Ser. No. 62/203,719, filed 11 Aug. 2015;

U.S. application Ser. No. 15/257,302 filed 6 Sep. 2016, entitled "System and Method for Determination and Remediation of Energy Diversion in a Smart Grid Network", which claims the benefit of U.S. provisional application Ser. No. 62/213,815, filed 3 Sep. 2015;

U.S. application Ser. No. 15/250,119 filed 29 Aug. 2016, entitled "Supplemental And Alternative Digital Data Delivery and Receipt Mesh Network Realized Through the Placement of Enhanced Transformer Mounted Monitoring Devices", which claims the benefit of U.S. provisional application Ser. No. 62/236,420 filed 2 Oct. 2015;

U.S. application Ser. No. 15/332,245 filed 24 Oct. 2016, entitled "Augmentation, Expansion and Self-Healing of a Geographically Distributed Mesh Network Using Unmanned Aerial Vehicle Technology", which claims the benefit of U.S. provisional application Ser. Nos. 62/244,914 and 62/244,919 filed 22 Oct. 2015 and U.S. provisional application Ser. No. 62/299,348, filed 24 Feb. 2016;

U.S. application Ser. No. 15/332,151 filed 24 Oct. 2016, entitled "Data Transfer Facilitation Across a Distributed Mesh Network Using Light and Optical Based Technology", which claims the benefit of U.S. provisional application Ser. No. 62/244,919, filed 22 Oct. 2015; and U.S. application Ser. No. 15/442,244 filed 24 Feb. 2017, entitled "Distributed 802.11s Mesh Network Using Transformer Module Hardware for the Capture and Transmission of Data", which claims the benefit of U.S. provisional application Ser. No. 62/299,348, filed 24 Feb. 2016;

which are all assigned to the assignee of the instant patent application, and which are all incorporated by reference in their entirety.

It should be understood that, unless stated otherwise herein, any of the features, characteristics, alternatives or modifications described regarding a particular embodiment herein may also be applied, used, or incorporated with any other embodiment described herein. Also, the drawing herein may not be drawn to scale in whole or in part. Although the invention has been described and illustrated with respect to exemplary embodiments thereof, the foregoing and various other additions and omissions may be made therein and thereto without departing from the spirit and scope of the present invention.

What is claimed:

1. A smart grid network comprising:
one or more transformer monitoring devices configured to collect metering data from one or more metering devices in the smart grid network and transformer data from one or more transformers in the smart grid network, and receive requests for digital content unrelated to the metering data and the transformer data from one or more other networked consumer digital devices connected to the one or more transformer monitoring devices via a wireless mesh network, the one or more other networked consumer digital devices accessing the wireless mesh network and including one or more of a personal computer, a mobile device, a tablet device or a set-top box;
a cloud-based data processing and storage system comprising:
one or more cloud data processors configured to receive data from the one or more transformer monitoring devices and process the received data into categories including at least a first category of data comprising the collected metering data;
at least one data store configured to store data of at least the first category of data;
an analytics platform configured to analyze the received and categorized data; and
a graphics server configured to format the analyzed data for display; and
at least one user device comprising a user interface and a display configured to display the analyzed data.

2. The smart grid network according to claim 1, wherein the one or more cloud data processors are configured to process the received data into the first category of data comprising transactional data including the collected metering data and at least a second category of data comprising notifications data.

3. The smart grid network according to claim 2, wherein the one or more cloud data processors are further configured to process the transactional data into a non-relational format for storage in a non-relational database and process the transactional data in the non-relational format into a relational format for storage in a relational database.

4. The smart grid according to claim 3, wherein the relational database is configured to transmit the stored data in the relational format to the at least one data store, and the at least one data store comprises a data mart configured to store data for a predetermined period of time, and a backup storage configured to provide a backup storage of the data stored in the data mart.

5. The smart grid network according to claim 2, wherein the one or more cloud data processors are further configured to transmit the notifications data to a short-term data storage prior to displaying the notifications data on the at least one user device.

6. The smart grid network according to claim 2, wherein the cloud-based data processing and storage system further comprises a collection engine in communication with the one or more transformer monitoring devices, the one or more cloud data processors, the analytics platform and the at least one user device.

7. The smart grid network according to claim 6, wherein the cloud-based data processing and storage system further comprises a scheduler configured to determine a regular time interval for collection of data from the one or more transformer monitoring devices by the cloud-based data processing and storage system.

8. The smart grid network according to claim 7, wherein the one or more cloud data processors of the cloud-based data processing and storage system are further configured to transmit on demand requests for data to the one or more transformer monitoring devices outside of the regular time interval for the collection of data or to the one or more metering devices directly.

9. The smart grid network according to claim 8, wherein on demand requests for metering data are initiated by one or more of the at least one user device and the collection engine.

10. The smart grid network according to claim 2, wherein the notifications data indicate an occurrence of a particular event in the smart grid network detected by the one or more transformer monitoring devices.

11. The smart grid network according to claim 1, wherein the at least one user device is a personal computer, a mobile device, a tablet device or a head-mounted display device configured to display the analyzed data using an augmented reality display.

12. The smart grid network according to claim 1, wherein the one or more transformer monitoring devices are configured to serve as network routing structures in forming an 802.11s wireless mesh network or other wireless mesh network through which the at least one or more transformer monitoring devices and one or more metering devices communicate, and
wherein the 802.11s wireless mesh network or other wireless mesh network is configured to provide network connectivity to the one or more other networked consumer digital devices.

13. The smart grid network according to claim 1, wherein the digital content requested by the one or more other networked consumer digital devices comprises one or more of digital video, digital audio, digital images, web page renderings, streaming media, video over internet and email communications.

14. The smart grid network according to claim 13, wherein the one or more transformer monitoring devices are further configured to transmit the requested digital content through the wireless mesh network for receipt by the one or more other networked consumer digital devices.

15. The smart grid network according to claim 13, wherein the one or more metering devices are further configured to transmit the requested digital content through the wireless mesh network for receipt by the one or more other networked consumer digital devices.

16. A method comprising:
collecting, by one or more transformer monitoring devices in a smart grid network, metering data from one or more metering devices in the smart grid network and transformer data from one or more transformers in the smart grid network, and receiving requests for digital content unrelated to the metering data and the transformer data from one or more other networked consumer digital devices connected to the one or more transformer monitoring devices or the one or more metering devices via a wireless mesh network, the one or more other networked consumer digital devices accessing the wireless mesh network and including one or more of a personal computer, a mobile device, a tablet device or a set-top box;

transmitting data collected by the one or more transformer monitoring devices to a cloud-based data processing and storage system;

receiving, by one or more cloud data processors of the cloud-based data processing system, the data transmitted from the one or more transformer monitoring devices;

processing, by the one or more cloud data processors, the received data into categories including at least a first category of data comprising the collected metering data;

storing, in at least one data store of the cloud-based data processing and storage system, data of at least the first category of data;

analyzing, by an analytics platform of the cloud-based data processing and storage system, the received and categorized data;

formatting, by a graphics server of the cloud-based data processing and storage system, the analyzed data for display; and displaying the analyzed data on at least one user device comprising a user interface and a display.

17. The method according to claim 16, wherein processing the received data into categories comprises processing the received data into the first category of data comprising transactional data including the collected metering data and at least a second category of data comprising notifications data.

18. The method according to claim 17, further comprising:
a further processing, by the one or more cloud data processors, of the transactional data into a non-relational format for storage in a non-relational database, and a further processing of the transactional data in the non-relational format into a relational format for storage in a relational database.

19. The method according to claim 18, further comprising transmitting, by the relational database, the stored transactional data in the relational format to the at least one data store, wherein the at least one data store comprises a data mart configured to store data for a predetermined period of time, and a backup storage configured to provide a backup storage of the data stored in the data mart.

20. The method according to claim 17, further comprising transmitting, by the one or more cloud data processors, the notifications data to a short-term storage prior to displaying the notifications data on the at least one user device.

21. The method according to claim 17, wherein the cloud-based data processing and storage system further comprises a collection engine in communication with the one or more transformer monitoring devices, the one or more cloud data processors, the analytics platform and the at least one user device.

22. The method according to claim 21, further comprising determining, by a scheduler of the cloud-based data processing and storage system, a regular time interval for collecting data from the one or more transformer monitoring devices by the cloud-based data processing and storage system.

23. The method according to claim 22, wherein the one or more cloud data processors of the cloud-based data processing and storage system are further configured to transmit on demand requests for data to the one or more transformer monitoring devices outside of the regular time interval for collecting data or to the one or more metering devices directly.

* * * * *